Sept. 1, 1942.　　　R. D. DODGE　　　2,294,722
TYPEWRITING MACHINE
Filed Oct. 12, 1938　　　9 Sheets-Sheet 1

RONALD D. DODGE
INVENTOR
BY J. W. Lownitzfer
ATTORNEY

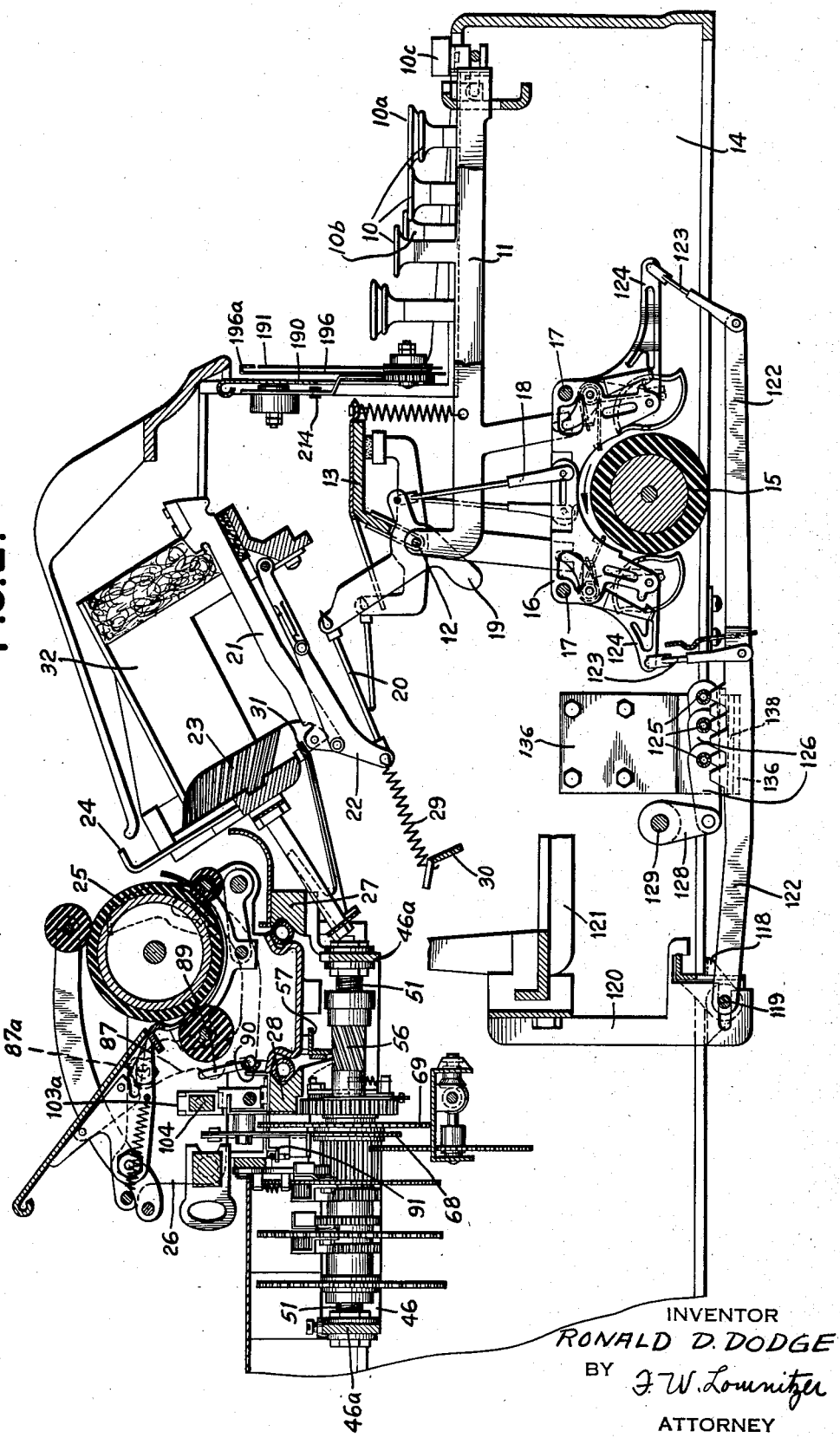

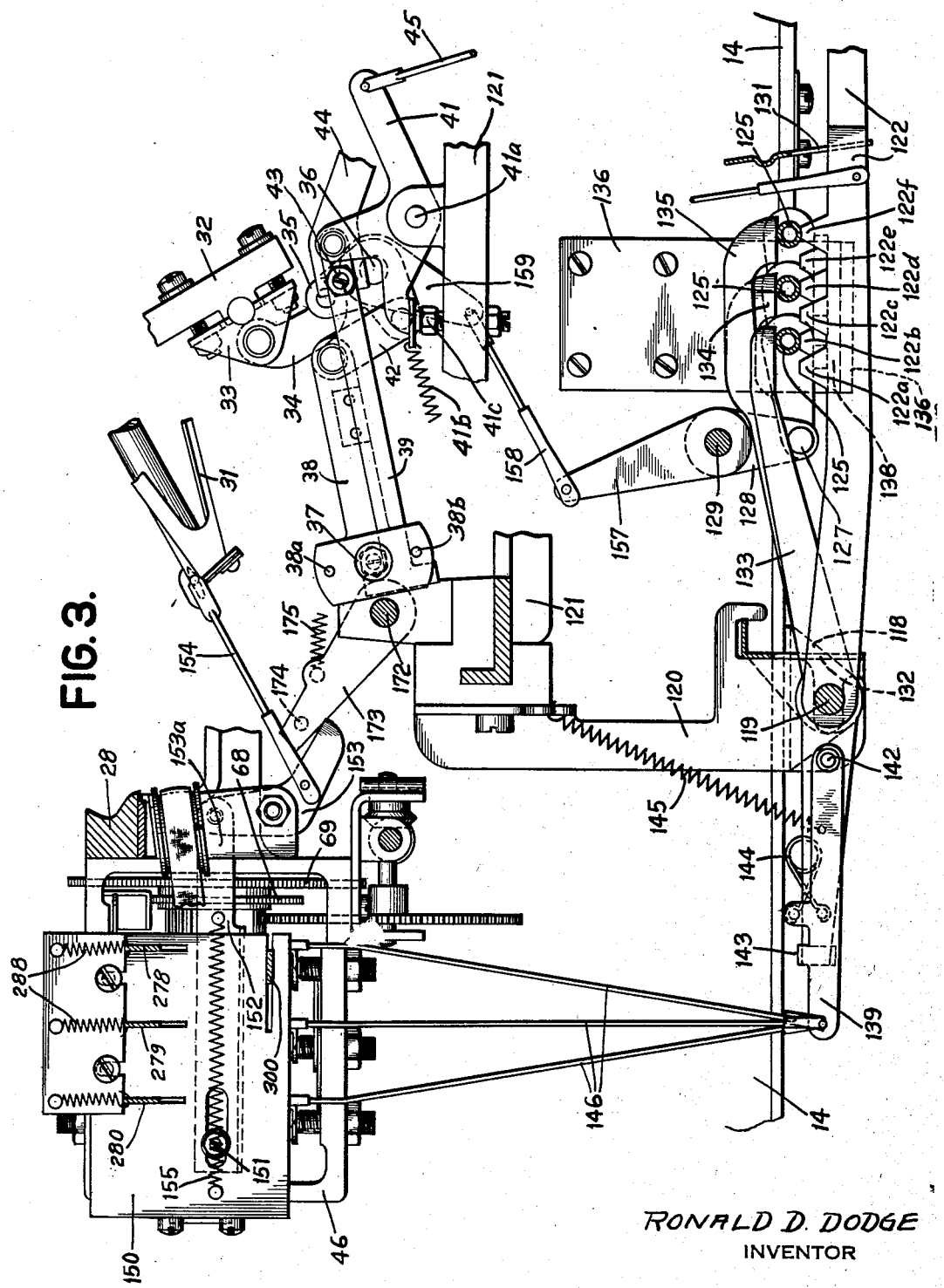

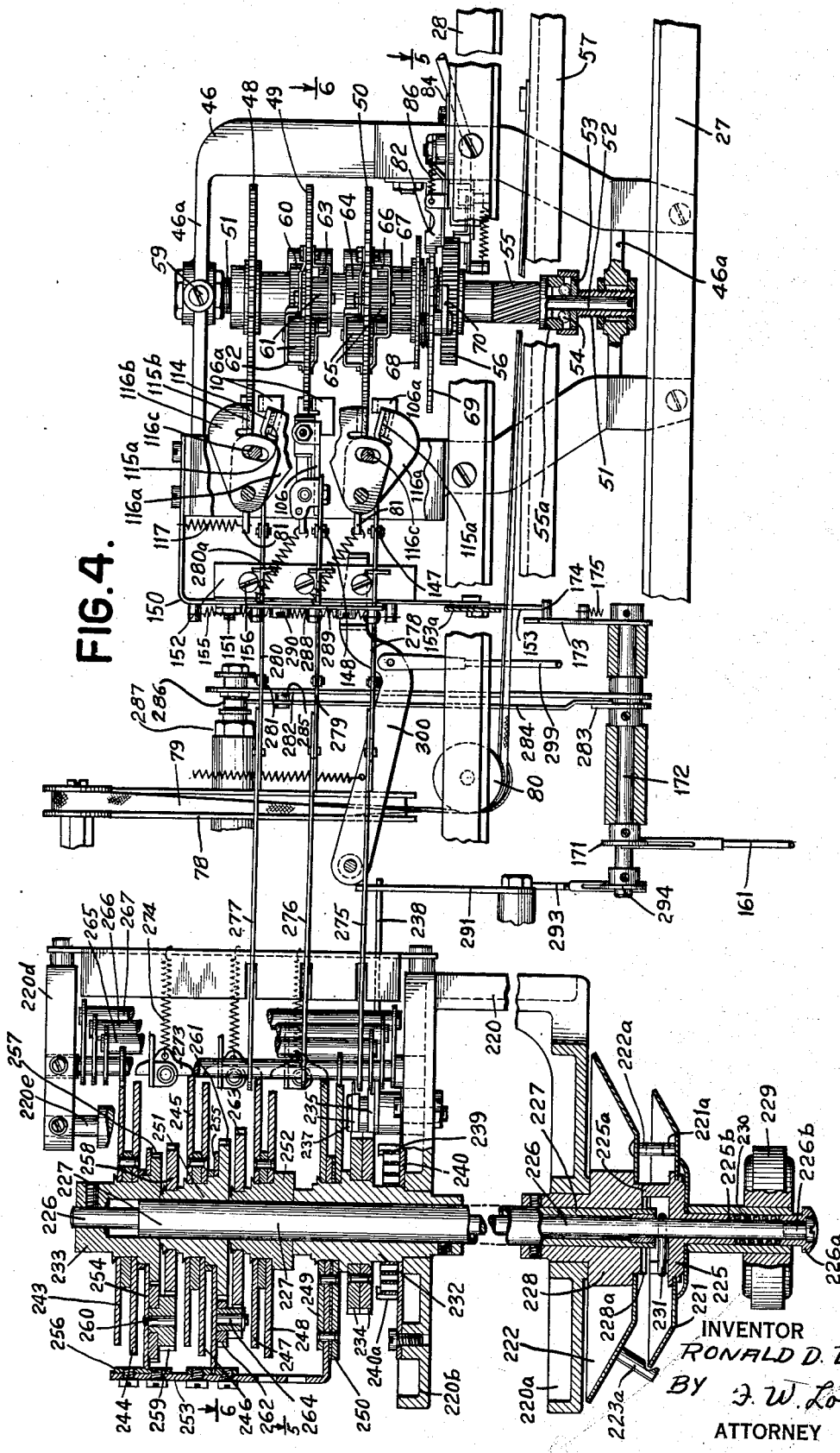

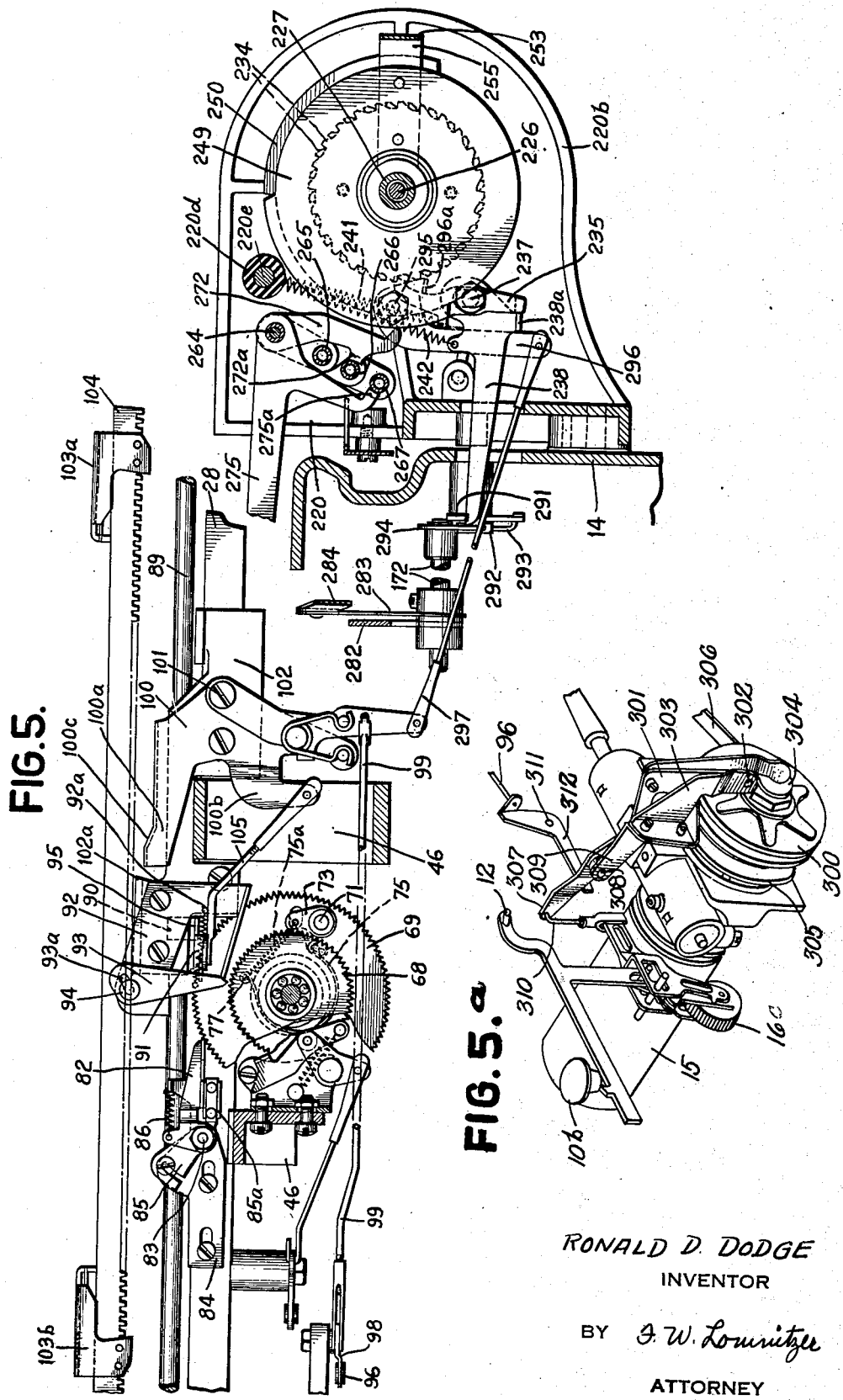

Sept. 1, 1942.   R. D. DODGE   2,294,722
TYPEWRITING MACHINE
Filed Oct. 12, 1938   9 Sheets-Sheet 6
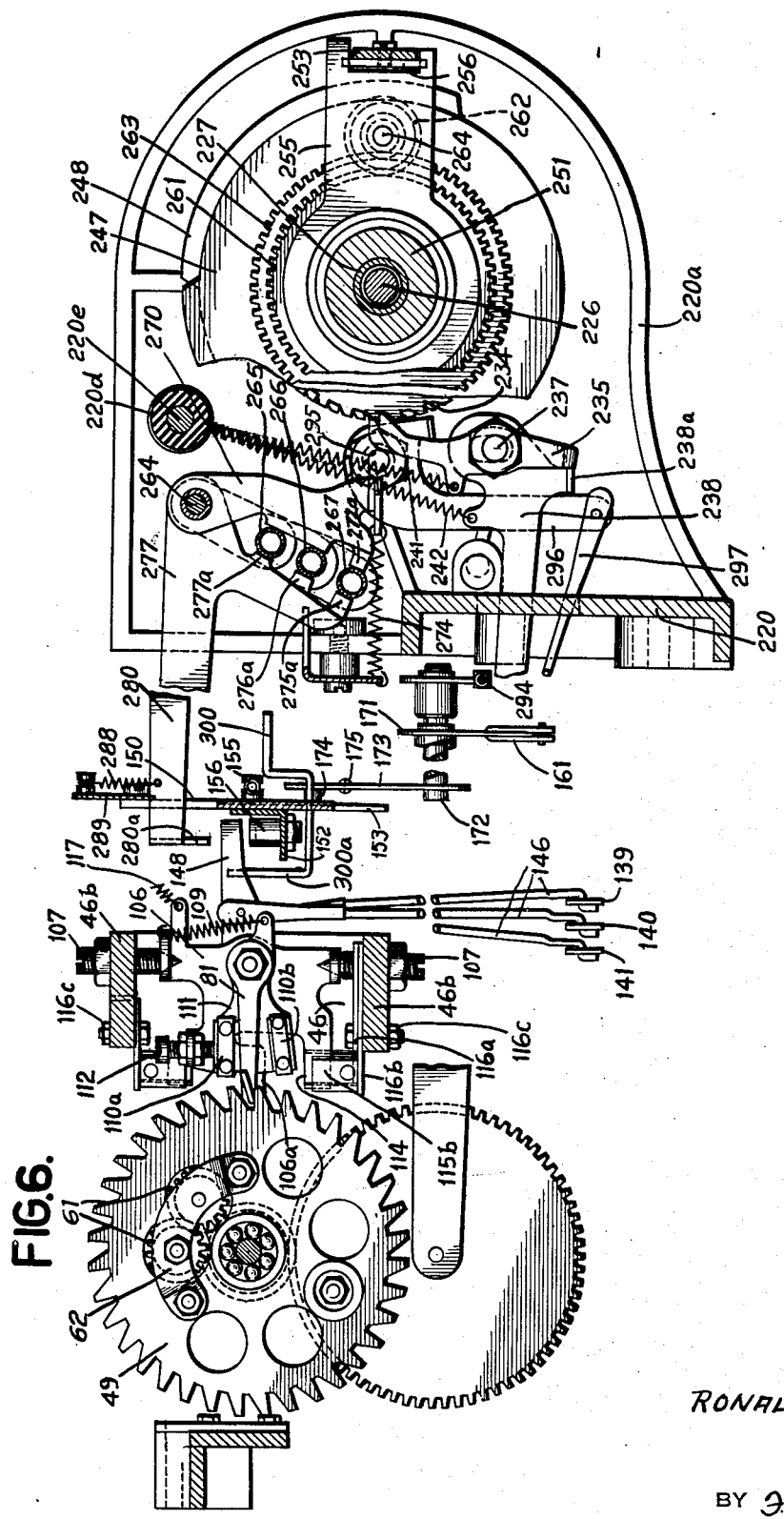
RONALD D. DODGE
INVENTOR
BY F. W. Lownitzer
ATTORNEY Sept. 1, 1942.                    R. D. DODGE                    2,294,722
                              TYPEWRITING MACHINE
                              Filed Oct. 12, 1938                9 Sheets-Sheet 7
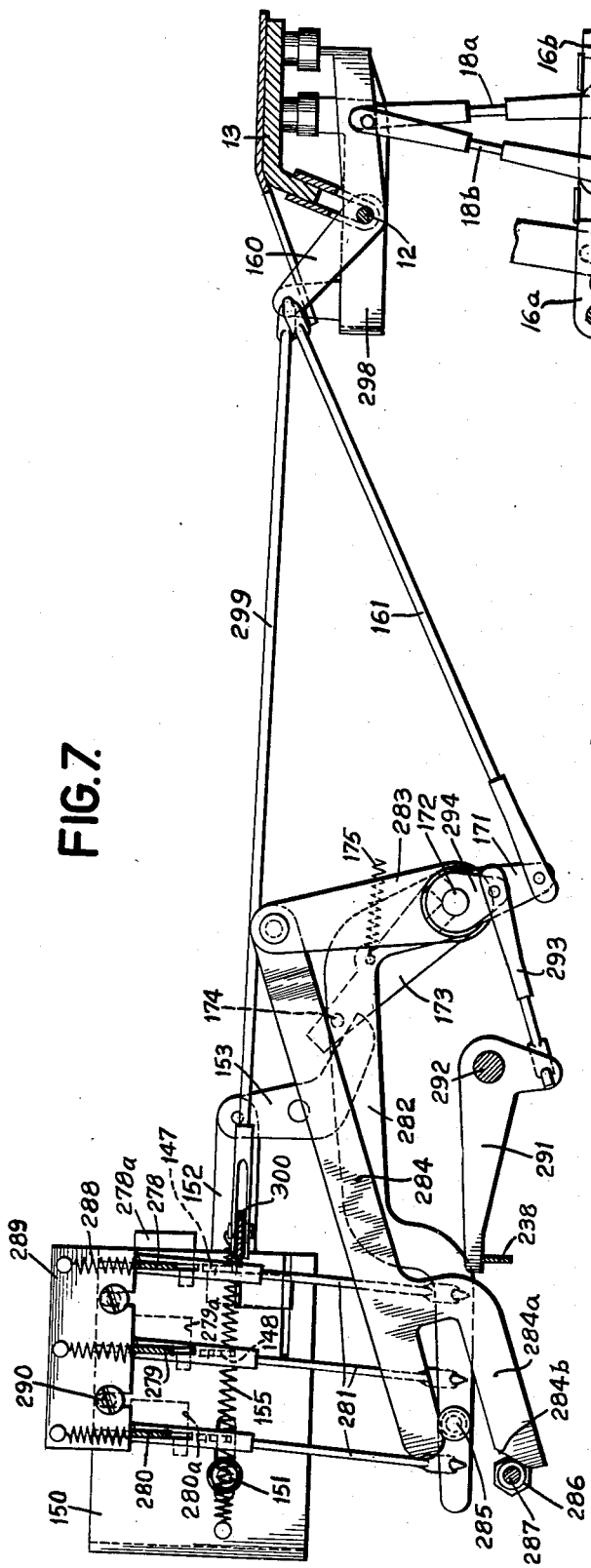
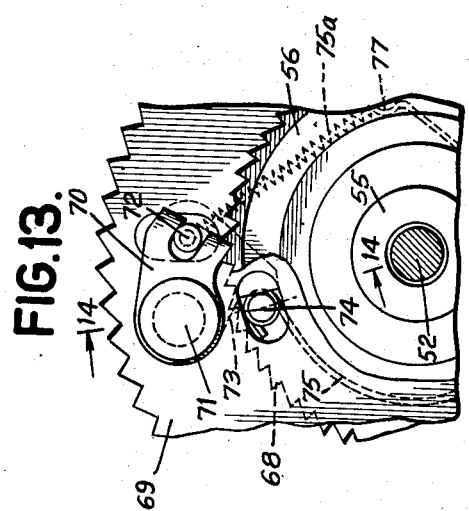
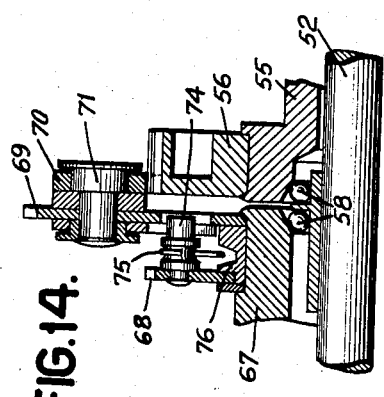
RONALD D. DODGE
INVENTOR
BY F. W. Lowritzer
ATTORNEY Sept. 1, 1942.   R. D. DODGE   2,294,722
TYPEWRITING MACHINE
Filed Oct. 12, 1938   9 Sheets-Sheet 8

RONALD D. DODGE
INVENTOR

BY F. W. Lomnitzer
ATTORNEY

Sept. 1, 1942.    R. D. DODGE    2,294,722
TYPEWRITING MACHINE
Filed Oct. 12, 1938    9 Sheets-Sheet 9
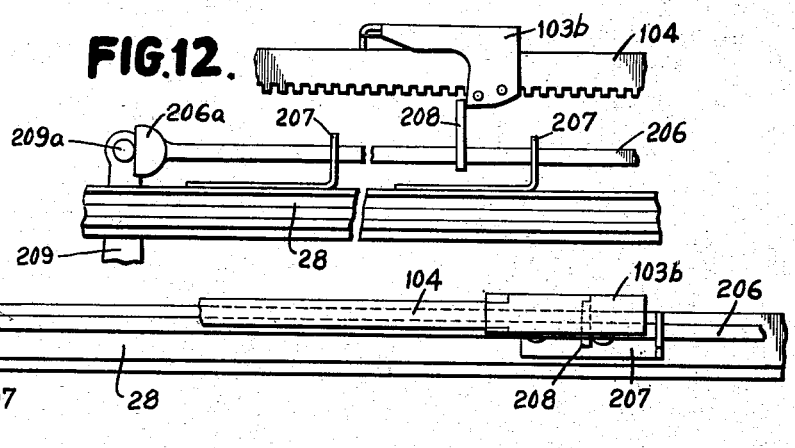
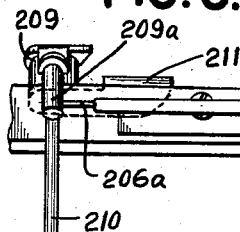
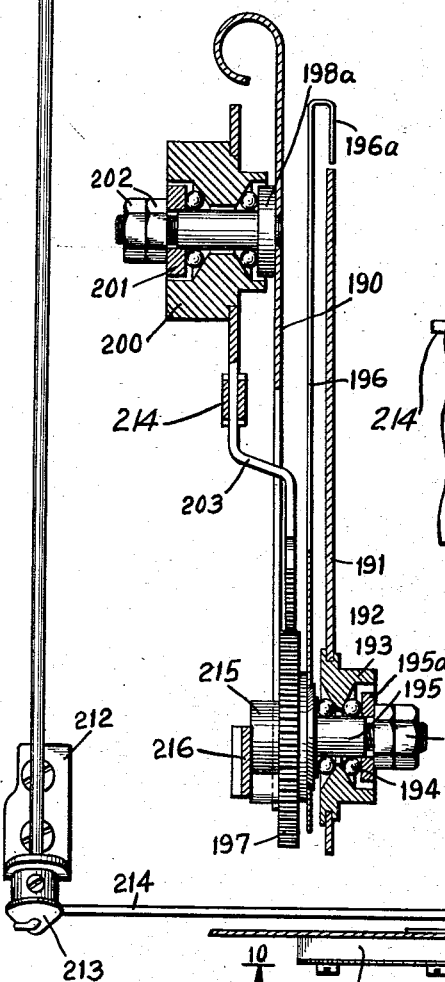
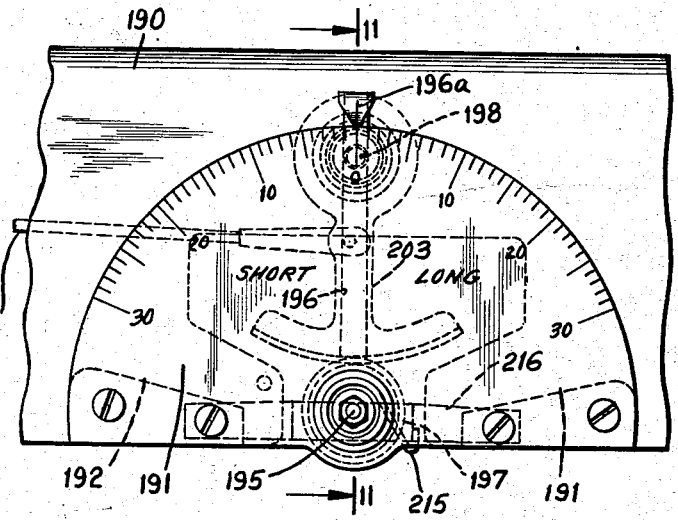
INVENTOR
RONALD D. DODGE
BY
F. W. Lowritzer
ATTORNEY Patented Sept. 1, 1942

2,294,722

UNITED STATES PATENT OFFICE 2,294,722

TYPEWRITING MACHINE

Ronald D. Dodge, Rochester, N. Y., assignor to International Business Machines Corporation, New York, N. Y., a corporation of New York Application October 12, 1938, Serial No. 234,563

37 Claims. (Cl. 197—84)

This invention relates to typewriting machines.

The broad object is to provide an improved machine for justifying typewritten copy.

An object is to provide means whereby justified copy may be obtained by means of a variable escapement typewriter having escapement mechanism which varies the feed of the carriage in accordance with the widths of the characters typed; for example, a machine like the one disclosed in application S. N. 148,270 filed June 15, 1937, by Ronald D. Dodge, now Patent No. 2,224,766, issued December 10, 1940.

An object is to provide a justification control mechanism which is relatively simple to install and operate.

An object is to provide a justification control mechanism for variable escapement typewriters which does not affect the spacing between the characters of a word, which may vary in accordance with the widths of the characters, but effects justification by causing an additional feeding movement to be imparted to the carriage between words.

An object is to provide a justification control mechanism which is controlled by the space bar or space key of the typewriter whereby the feed may be automatically varied between the words of a line to the extent necessary to make each typed line conform to an arbitrary standard of line length.

An object is to provide a justification control mechanism which is completely independent of the position of the carriage or its movements, that is, has no direct connection to the carriage, whereby any zone on a work sheet may be arbitrarily used without manipulating or setting the justifying control mechanism to conform to such zone. In other words, an object is to provide a justification control mechanism which does not depend on the movement of the carriage and has no connections thereto, such as inclinable tracks, cams, links, or gears, requiring that the carriage and justifying mechanism be aligned, synchronized, or manually mechanically set in a predetermined relationship in order to render the justifying control mechanism effective.

As will be shown hereinafter, the present invention has only two manual setting dials or their equivalent and the mechanism controlled by these dials automatically controls the operations of the escapement in response to operations of the space bar or space key. Thus the carriage is conditioned for the justification of typewritten copy merely by setting the marginal stops and paper guides for the desired length and position of the line to be typed on the work sheet.

An object is to provide a justification control mechanism which does not overload the carriage or in any way add to the mass thereof, and hence does not have the objection of the retarding effect of prior justifying mechanisms on the carriage, either due to the additional weight imposed on the carriage or due to the restraint exercised by mechanical connections to the carriage which characterize prior justifying mechanisms.

An object is to provide a justification control mechanism which is connected to the machine in such a way that the machine may be used independently of the justification mechanism without setting any levers or other manual devices.

An object is to provide a justification control mechanism which is automatically reset to inactive position at the end of each line whereby the machine is always in readiness for typing in the normal way independently of the justification control mechanism.

An object is to provide a justification control mechanism which is selectively set solely by two easily manipulated dials or equivalent manual devices such as levers or keys located within easy reach of the operator.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Fig. 2 is a vertical section approximately through the center line of the machine;

Fig. 3 is a large scale vertical section showing the shift mechanism and escapement selecting mechanism;

Fig. 4 is a view in which the justifying mechanism is shown in horizontal section and the variable escapement mechanism is shown in plan;

Fig. 5 is a vertical section on the line 5—5 in Fig. 4;

Fig. 5a is a perspective view of the carriage return mechanism;

Fig. 6 is a vertical section on the line 6—6 in Fig. 4;

Fig. 7 is a large scale view in side elevation of certain mechanisms controlled by the space bar;

Fig. 9 is a plan view of the indicator and its operating mechanism;

Fig. 10 is a front view of the indicator;

Fig. 11 is a vertical section on the line 11—11 of Fig. 10;

Fig. 12 is a detail view in front elevation of the right hand marginal stop and part of the indicator operating mechanism;

Fig. 13 is a large scale detail view of part of the carriage release mechanism;

Fig. 14 is a section on the line 14—14 in Fig. 13.

The drawings illustrate the present invention as applied to the "International" electric writing machine, formerly known as the "Electromatic." However, it will be understood the invention is not limited in its application to the specific machine selected for purposes of illustration but may be applied to other typewriters equally as well, whether manually or power operated. Since the "International" electric writing machine is now well known in the art and fully described in patents covering the various mechanisms comprising this machine, only a very brief general description will be given of the machine such as will enable the present invention to be readily understood.

Figure 1:
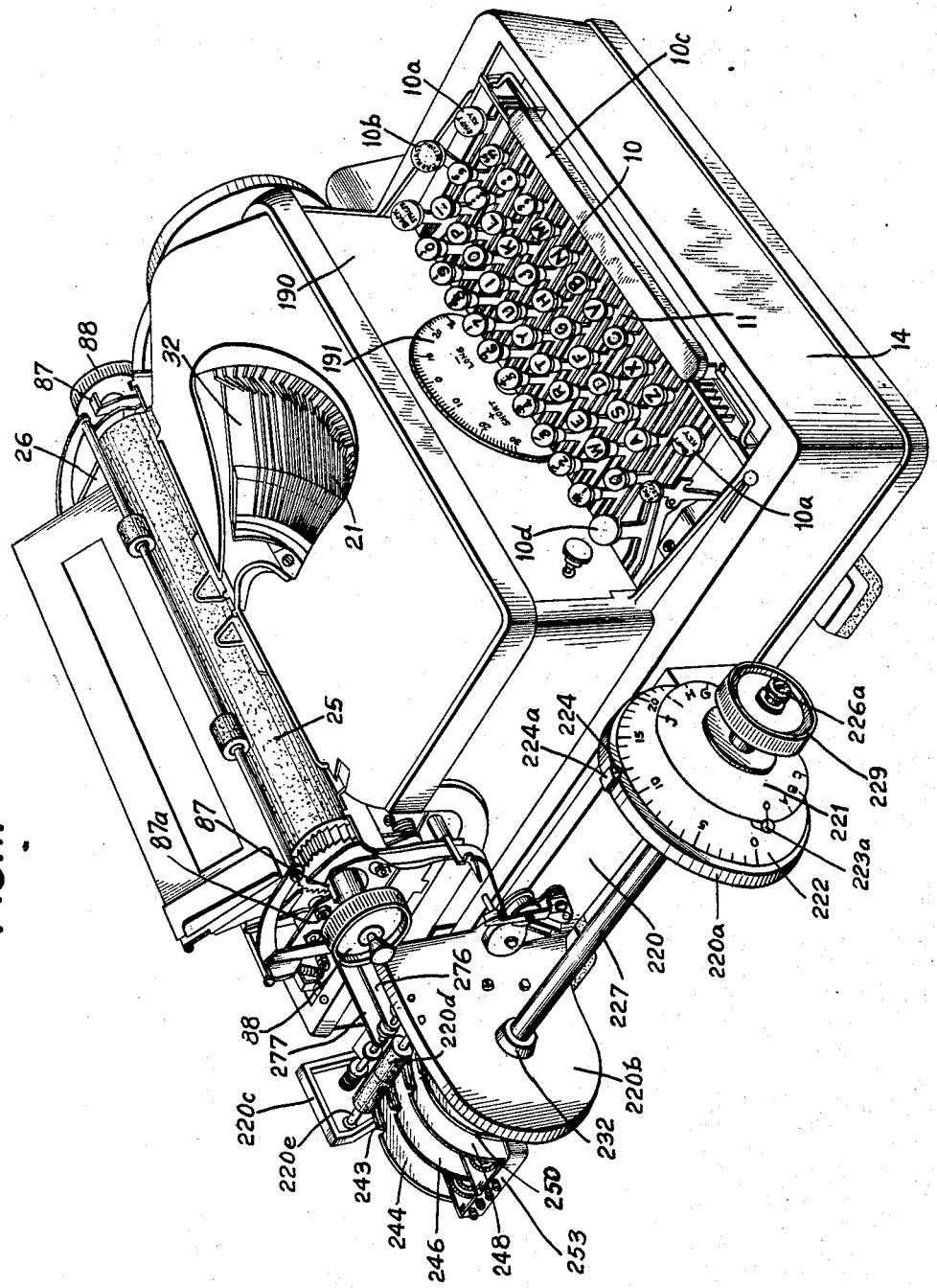
Fig. 1 is a perspective view of the machine.

The numeral 10 in Figs. 1 and 2 designates the usual character keys on key levers 11 pivoted on a rod 12 which is supported by a cross frame 13 rigidly mounted in the base 14. Rotatably mounted in the base 14 is the power roller 15 which is rotated in the direction of the arrow (Fig. 2) by means of a suitable motor, not shown. When the machine is in use the power roller 15 rotates continually.

Cooperating with the power roller 15 (Fig. 2) are the cam units 16 which are pivotally mounted on rods 17 extending parallel with the power roller 15. There is a cam unit 16 associated with each of the key levers 11 and each cam unit is connected by a link 18 with a sub-lever 19 pivoted on rod 12. The sub-levers 19 are connected by links 20 to type bars 21 through the medium of toggles 22. The type bars 21 are pivoted in the usual wire segment 23 provided with a type guide 24 located in front of the platen 25. The platen is, as usual, rotatably mounted in the carriage 26 which is supported on front and rear rails 27 and 28, respectively, by means of suitable anti-friction roller trucks. Springs 29 connected to a curved spring anchoring member 30 and to toggles 22 provide means for restoring the toggles and type bars to the normal position shown in Fig. 2.

When any character key 10 (Fig. 2) is depressed, its cam unit 16 is caused to operatively engage the power roller 15 in a well known way thereby rocking the cam unit 16 clockwise or counterclockwise according to whether the operative cam unit is pivoted on the left hand or right hand rod 17, respectively. The rocking of the cam unit causes its link 18 to be drawn downwardly, thereby rocking the corresponding sub-lever 19 in a clockwise direction. This movement of the sub-lever 19, through the corresponding link 20 and toggle 22, causes the type bar 21 associated with the selected key to rock in a counterclockwise direction to effect the impression of the type upon a work sheet wrapped around the platen 25. The type bar, near the end of its operative stroke, engages the usual universal bar 31 and causes the universal bar to move rearwardly and downwardly in Fig. 2.

The segment 23 is mounted in a frame 32 which forms part of the type basket. The type basket is movably mounted in the framework of the machine for case shifting movement in a well known way and normally occupies an elevated position shown in Fig. 2 for the typing of the lower case characters. The shift mechanism for drawing the type basket 32 downwardly to permit the printing of capital letters is described in Patent No. 1,945,097 and is partly shown in Fig. 3.

Secured to the back of the type basket frame 32 (Fig. 3) is a pair of brackets like 33 connected by toggle links 34 to the arms of toggle levers 35 secured on the ends of a shaft 36 journaled in the framework of the machine. Pivoted on a stud 37 is a three-armed lever 38 having two pins 38a, 38b engageable by the short arms of a T-shaped lever 39 which is pivoted at 40 to one arm of a three-armed lever 41. The lever 41 is pivoted on a stud 41a and a spring 41b normally holds the lever 41 in the position of Fig. 3 with one of its arms engaging a stud 41c on a fixed part of the framework. The lever 38 is connected by a link 42 to one arm of one of the toggle levers 35. The T-lever 39 has a stud 43 projecting into a slot formed in an arm 44 formed as an extension of the key lever for one of the shift keys 10a (Fig. 2). One arm of lever 41 (Fig. 3) has a link connection 45 to a cam unit, not shown, which is controlled by both of the shift keys 10a.

When either of the shift keys 10a is depressed, the left hand end of the T-lever 39 is elevated to bring one of the short arms thereof to a position to the left of the pin 38a, this movement taking place before the cam unit controlled by the shift key is operatively connected to the power roller 15. When the cam unit controlled by the shift key is operated by the power roller 15, the link 45 is drawn downwardly thereby rocking lever 41 in a clockwise direction on stud 41a against the tension of spring 41b. This draws the T-lever 39 to the right in Fig. 3, thereby, through the engagement of the short arm of said T-lever with the pin 38a, rocking the lever 38 clockwise. Through the link connection 42, the toggle levers 35 and shaft 36 are rocked in a counterclockwise direction, thereby bending the toggles comprising the links 34 and the arms of levers 35, causing the type basket to be drawn downwardly.

The mechanism briefly described above is old and well known in the art.

The escapement mechanism is mounted in a frame casting 46 (Figs. 2 to 6) which is secured to the undersides of the front and rear rails 27, 28. The frame 46 is formed with two parallel struts 46a (see Fig. 4) supporting the escapement ratchets which are designated 48, 49, and 50. Externally threaded sleeves like 51 are loose in aligned holes in the struts 46a and support the rod 52 on which the ratchets 48, 49, and 50 are rotatably mounted. Abutting the end of each sleeve 51 is a thrust washer 53 alongside of which are located the balls 54 of a combination axial and radial thrust bearing of which the outer ball race 55a is integral with a spiral pinion 55 secured to a ratchet 56. The pinion 55 meshes constantly with a spiral rack 57 (Figs. 2 and 4) which is secured to the underside of the carriage 26.

The rear end of the pinion 55 is formed as a ball race (see Fig. 14) in cooperation with balls 58 whereby the pinion 55 and ratchet 56 rotate freely on the rod 52. The latter is relatively fixed in the framework by means of a set screw 59

(Fig. 4) which projects through a slot in the rear sleeve 51. A similar thrust washer like 53 abuts the end of the rear sleeve 51 to retain balls which freely rotatably mount one end of the hub of ratchet 48 on the rod 52.

The hub of ratchet 48 (Fig. 4) is integral with a pinion 60 located adjacent the hub of the ratchet 49. The pinion 60 meshes with one of a pair of intermeshing pinions 61 rotatably mounted on brackets 62 carried by the ratchet wheel 49 while the other pinion 61 meshes with a pinion 63 which is secured to a pinion 64. The latter meshes with one of a pair of intermeshing pinions 65 like pinions 61 and mounted on brackets 66 carried by ratchet wheel 50, while the other pinion 65 meshes with a pinion 67.

Rotatably mounted on the pinion 67 is a ratchet wheel 68 (Figs. 2 to 5, 13 and 14) which is of the same diameter as the ratchet 56 while secured to the pinion 67 is a ratchet 69 which is considerably larger in diameter than the ratchets 56, 68. The ratchets 56 and 69 are normally connected for driving purposes by means best shown in Figs. 13 and 14 comprising a dog 70 pivoted on a stud 71 fixedly mounted on the ratchet wheel 69. The dog 70 normally engages the teeth of the ratchet wheel 56 whereby the ratchet wheel 69 will be rotated in a counter-clockwise direction (Fig. 13) whenever the ratchet wheel 56 is similarly rotated by letter spacing movement of the carriage. The dog 70 is slotted to embrace a stud 72 carried by a member 73 also pivotally mounted on the stud 71. The member 73 has a lug engaging a stud 74 secured to the side of ratchet wheel 68. A torsion spring 75 (see Fig. 5 also), hooked over the end of stud 74 and lying in a groove formed in a collar 76 on the pinion 67 and also anchored to a stud 77 (Fig. 5) on ratchet 69, normally tends to rotate the ratchet 68 in a counterclockwise direction (Fig. 13) or in a clockwise direction (Fig. 5). A spring 75a, anchored to studs 72 and 77, holds the end of dog 70 in engagement with the teeth of ratchet 56.

Movement of the carriage is effected, as usual in typewriting machines, by means of a spring drum 78 shown in Fig. 4 on which drum is wound the tape 79. This tape passes over a pulley 80 mounted on the rear rail 28 and thence to the right hand end of the rack 57 at which point the tape 79 is secured to the rack. Due to the constant tension produced in the tape 79 by the spring drum 78, the carriage 26 tends to move to the left (Fig. 1). Thus the ratchet 56 always tends to rotate the ratchet 69 and pinion 67 in a counterclockwise direction (Fig. 13). This rotational tendency of the pinion 67 is communicated to the ratchet wheels 48, 49, and 50 (Fig. 3) through the train of connections comprising the pinions 60, 61, 63, 64, 65. Normally, however, this rotational tendency has no effect, so far as movement of the carriage is concerned, because the ratchet wheels 48, 49, and 50 are restrained from rotation by means of the loose dogs 81 (Fig. 6) of the escapement mechanism.

Reverse rotation of the ratchet 69 and pinion 67 is prevented by means of a dog 82 (Figs. 4 and 5) pivoted on a stud 83 carried by a plate 84 which is adjustably secured to the rear rail 28. Also pivoted on stud 83 is a bracket 85 having a bumper 85a composed of resilient material such as leather against which the dog 82 is normally held in engagement with ratchet 69 by a spring 86. The bracket 85 is adjustably rotated on the stud 83 until the free end of said dog 82 engages one wall of a tooth in the ratchet 69 but does not quite touch the other wall of the adjacent tooth, the object being to silence the clicking noise which ordinarily is experienced with similar ratchet-and-pawl mechanisms due to the end of the dog striking the side of the next succeeding tooth after riding over a given tooth.

It is desirable to be able to release the escapement mechanism from the carriage for the purpose of moving the carriage by hand, or when the carriage is to be returned by the usual power operated carriage return mechanism. For this purpose, there is provided release mechanism which is operated by the usual carriage release levers 87 (Figs. 1 and 2), these levers being pivoted on studs 87a on the side plates of the carriage with the free ends of levers 87 adjacent the usual platen rotating knobs 88. Each lever 87 abuts one end of a bail comprising a bent rod 89 (Fig. 2) pivotally mounted in the side plates of the carriage. When either of the levers 87 is depressed, the bail is rocked clockwise in Fig. 2 thereby causing the rod 89 to move rearwardly of the platen or forwardly in Fig. 5. A lug 90 formed in a lever 91 (Figs. 2 and 5) pivoted on the top surface of the rear rail 28 is thereby moved rearwardly of the platen, or forwardly in Fig. 5 whenever the bail 89 is moved by the release levers 87.

Mounted on a bracket 92 (Fig. 5) is a release dog 93 having a slot 93a embracing a stud 94 carried by the bracket 92. A spring 95, anchored to the lower end of the dog 93 and to the bracket 92, normally holds the lower end of said dog against a stop lug 92a formed in the bracket 92, with the stud 94 at the lower left hand end of the slot 93a. In this position of the dog 93, the lower end thereof, which is in the plane of the ratchet 68, is held clear of said ratchet. Whenever the lever 91 is moved forwardly in Fig. 5 by the rod 89 as a consequence of the operation of one of the release levers 87, the dog 93 is moved to the left in Fig. 5. Due to the inclination of the slot 93a, the dog 93 is first caused to move downwardly into engagement with ratchet 68 and thereafter, by a clockwise pivotal movement of said dog on the stud 94, the ratchet 68 is moved by dog 93 in a counterclockwise direction relative to the ratchet 69 (Fig. 5) or clockwise in Fig. 13. Through the cooperation of the pin 74 on ratchet 68 with the lug on member 73, and the cooperation of pin 72 with the slot in the dog 70, the latter is lifted out of engagement with the teeth of ratchet 56 thereby permitting said ratchet to be moved independently of the ratchet 69. Thus the carriage may be moved by hand or by the power operated return mechanism without disturbing the escapement mechanism and without the escapement mechanism interfering with the movement of the carriage.

The dog 93 is actuated automatically whenever the usual power operated return mechanism operates to return the carriage prior to writing a new line. In the "International" electric writing machine, the carriage is returned by power mechanism like the one disclosed in Patent No. 2,104,559 under control of a carriage return key 10b. This mechanism will not be described in detail in the present case because its specific construction is not a feature of the invention claimed hereinafter. When the carriage return key 10b (Figs. 1 and 5a) is depressed, a cam unit 16c (Fig. 5a) is rendered operable by the power roller 15. This cam unit operates the carriage return clutch 300 through mechanism which includes a lever 301 pivoted at 302 to a bracket 303 secured to the base of the machine. The lower end of the lever 301 bears against a cap 304 forming part of the clutch assembly 300 mounted on the main drive shaft for power roller 15.

When the lever 301 is rocked in a clockwise direction (Fig. 5a) about the pivot 302, the cap 304 is pressed to the left to engage the clutch 300. This causes rotation of a tape drum 305, to which the carriage return tape 306 is attached, thereby applying tension to said tape. The tape 306 is connected to the carriage in a well known way so as to actuate the line space mechanism and return the carriage.

The upper end of lever 301 is connected by a short link (not shown) to one end of a lever 307 pivoted at 308 to a bracket 309 secured to the base of the machine by the same fastening means as the bracket 303. Lever 307 and the link which is not shown together form a toggle operative in a well known way to lock the lever 301 in the clutch engaging position so as to maintain the clutch in engaged position while the carriage is returning. Lever 307 is connected to the cam unit 16c by means of a link 310 whereby, when the cam unit 16c is rocked in a clockwise direction by the power roller 15, link 310 is drawn downwardly to straighten the toggle including lever 307, thereby rocking the lever 301 in a clockwise direction to engage the clutch 300.

Pivoted at 311 is a bell crank 312, one arm of which extends under the arm of lever 307 to which the link 310 is connected whereby, when lever 307 is operated by the cam unit 16c, the bell crank 312 will be rocked in a counterclockwise direction (Fig. 5a). The link 96 is connected to one arm of a bell crank 98 (Fig. 5) which in turn is connected by a link 99 to a three-armed lever 100 pivoted at 101 to a plate 102 secured to the rear rail 28. The bracket 92 is also secured to the plate 102. Whenever the carriage return mechanism is operated, link 99 is drawn to the left (Fig. 5) to rock the lever 100 in a clockwise direction and the lever remains in this position as long as the carriage return clutch is held in engaged position by the toggle including the lever 307.

The three-armed lever 100 controls the release of the carriage return clutch and, when operated as described, moves one arm of said lever 100a (Fig. 5) into the path of the left hand marginal stop 103a carried by the usual marginal stop rack 104 mounted on the carriage. Through the arm 100b and a link 105, which interconnects said arm 100b with the lever 91, the dog 93 is operated to disengage the dog 70 from the ratchet 56. During a carriage return operation, the ratchet 56 rotates in a clockwise direction (Fig. 13) whereby, if the dog 70 were not released by the connection including 105, a clicking noise would result which is undesirable, as it makes the operation of the machine rather noisy. When the carriage approaches its left hand marginal position, the left hand marginal stop 103a strikes a cam surface 100c in the arm 100a of lever 100 and rocks said lever 100 in a counterclockwise direction thereby, through the links 96, 99, and bell crank 98, and other connections not shown, disengaging the carriage return clutch, and also permitting dog 93 to become restored by spring 95 to the position shown in Fig. 5. A lug 102a formed in plate 102 is engaged by the left hand marginal stop 103a to arrest the carriage at the left hand marginal position. This lug 102a is also engaged by the right hand marginal stop 103b (Fig. 5).

The ratchet wheels 48, 49, and 50 have 27, 36, and 27 teeth, respectively, whereby the amount of feeding movement imparted to the carriage may be varied. Due to the method of interconnecting the ratchet wheels by means of intermeshing pinions, the ratchet wheels 48 and 50 rotate in a direction opposite to the ratchet 49. Assuming for the moment that the ratchet wheels 48 and 49 (Fig. 4) are fixed and immovable, the pinion 64 will be locked against rotation, therefore, if ratchet wheel 50 is now permitted to rotate one tooth space, one of the pinions 65 will roll around said pinion 64 and, by rotating the other pinion 65, will permit the pinion 67 to rotate in the same direction as the ratchet wheel 50 but twice as much as ratchet wheel 50. Similarly, if the ratchet wheels 48 and 50 are locked and the ratchet wheel 49 is permitted to move, one of the pinions 61 will roll around the pinion 60 and cause pinions 63, 64 to be rotated. The rotation of pinion 64 is communicated to pinion 67 through the intermeshing pinions 65. As in the case of ratchet wheel 50, pinion 67 rotates twice as much as ratchet wheel 49. However, when the ratchet wheels 49 and 50 are held and ratchet wheel 48 rotates, the same amount of movement will be communicated from the ratchet wheel 48 to the ratchet wheel 67 through the pinions 61, 63, 64, 65 acting as idlers. It is possible, however, to permit the ratchet wheels 48, 49, and 50 to rotate in combinations to produce an accumulative effect upon the pinion 55 which, of course, will permit the carriage to move correspondingly.

Since the ratchet wheel 48 has twenty-seven teeth, the pinion 67 and hence the pinion 55 will be rotated $\frac{1}{27}$ of a revolution whenever the ratchet wheel 48 rotates one tooth space. On the other hand, since the movement of the pinion 67 is twice that of the ratchet wheel 49 and the latter has thirty-six teeth, the pinions 67 and 55 will be rotated the equivalent of $\frac{1}{18}$ of a revolution of the ratchet wheel 49. Likewise, the ratchet wheel 50 having twenty-seven teeth, pinions 67 and 55 will be rotated $\frac{2}{27}$ of a revolution of the ratchet wheel 50. Reducing these fractions to a common denominator of 54, it will be seen that the movements of pinions 67 and 55 produced by the ratchet wheels 48, 49, 50 are $\frac{2}{54}$, $\frac{3}{54}$, and $\frac{4}{54}$ of a revolution, respectively, per tooth space on the respective ratchet wheels. The gearing is so designed and the spacing of the teeth on the ratchet wheels has been so selected that ratchet wheel 48 causes the carriage to move two units of spacing, ratchet wheel 49 three units of spacing, and ratchet wheel 50 four units of spacing.

It is thus possible to secure 7 different spacings of the carriage which, in terms of units of carriage spacing, are as follows: 2, 3, 4, 5, 6, 7, 9. Thus the spacing of the carriage can be accommodated to seven different widths of letters if necessary. The means by which the escapement wheels 48, 49, 50 are selectively controlled will be described in the following paragraphs.

The rotation of the escapement ratchet wheels 48, 49, 50 is controlled by means of three dog rocker mechanisms which are selectively controlled by power operated selecting mechanism. Fig. 6 shows the dog rocker mechanism for the ratchet wheel 49. Each dog rocker mechanism includes a dog rocker plate 106 which is pivotally mounted on vertically aligned conical studs 107 screwed into threaded holes in two parallel and horizontal portions 46b of the frame 46. The conical points of the studs 107 are seated in conical holes in lugs formed in the dog rocker plate 106. Pivoted on a shoulder on a stud 108 on the rocker plate 106 is the usual loose escapement dog 81, mentioned hereinbefore, which is actuated by a spring 109 so as to be urged in a counterclockwise direction (Fig. 6). The left hand end of the dog 81, engaging one of the teeth of the ratchet 49, however, is held in the position of Fig. 6 owing to the tension of the spring drum 78 (Fig. 4) being greater than the tension of the spring 109 (Fig. 6) whereby the dog 81 is forced against a resilient stop 110a mounted on an arm 111 which is rotatably secured to the side of the rocker plate 106 by means of the stud 108. The shoulder on stud 108, on which the dog 81 is loose, permits the arm 111 to be secured to the plate 106 without binding the dog. The upper left hand portion of the arm 111 is provided with a bent-over lug against which bears an adjusting screw 112 carried by a lug formed in the rocker plate 106. By turning the screw 112 in one direction or another, the arm 111 may be rotatably adjusted about the stud 108 as a pivot. The dog rocker plate 106 (Fig. 4) is provided with a lug 106a which is substantially in horizontal alignment with the left end of the dog 81 but does not normally engage the teeth of the ratchet wheel 49.

When the rocker plate 106 is rocked in a counterclockwise direction (Fig. 4), the lug 106a is moved into the tooth space occupied by the dog 81 before said dog is moved free of the ratchet wheel whereby, when the dog ultimately clears the teeth of the ratchet wheel 49, the latter is permitted to rotate counterclockwise a fraction of a tooth space in Fig. 6. The spring 109 then rocks the dog 81 in a counterclockwise direction until said dog strikes a resilient stop 110b mounted on the arm 111. The stops 110a, 110b on arm 111 are so spaced that the end of dog 81 assumes a position in horizontal alignment with the next lower tooth space of ratchet wheel 49.

When the plate 106 is restored to the position of Fig. 4, the end of dog 81 is moved into the path of the next lower tooth on ratchet wheel 49 before the lug 106a clears the teeth in ratchet 49. When the lug 106a finally clears the teeth in the ratchet 49, the latter will be permitted to rotate in a counterclockwise direction (Fig. 6) the remainder of a tooth space, thereby bringing the end of dog 81 back against the resilient stop 110a. Thus, by giving the plate 106 one complete oscillation the escapement ratchet 49 is permitted to turn one full tooth space.

The rocker plate 106 (Figs. 4 and 6) is formed with a lug 114 which extends between two resilient stops 115a, 115b mounted on arms 116a, 116b, respectively, which arms are pivoted in scissors fashion on one of the conical studs 107. The stops 115a, 115b, being located on opposite sides of the lug 114, adjustably limit the oscillatory movements of the plate 106 on the studs 107 as pivots. Plates 116a, 116b are secured to frame 46 by means of bolts 116c.

Similar mechanism is provided for the other two ratchet wheels 48, 50 but, owing to the fact that these two ratchet wheels rotate in a direction opposite to the ratchet wheel 49, the rocker plates 106 for the ratchet wheels 48, 50 are in effect inverted. Normally, the plates 106 are held by springs 117 (Fig. 4) with their lugs 114 abutting the stops 115a, as shown in Fig. 3, with all of the dogs 81 engaging the teeth of their respective ratchets. Springs 117 are anchored to lugs formed in plates 106 and to a bracket secured to frame 46.

The rocker plates 106 are selectively and combinationally operated through power operated mechanism controlled by the keys 10 which selecting mechanism now will be described.

Rigidly mounted on brackets 118 (Figs. 2 and 3) secured to the lower edges of the sides of the base 14 is a rod 119 which is steadied at its midpoint by extending through a slot in a bracket 120 secured to the frame 121 which supports the case shift mechanism and the type basket by means not shown. Pivotally mounted on the rod 119 are selector bars 122 which extend forwardly and horizontally to points underneath the cam units 16. There is a selector bar 122 for each cam unit 16 and its key. Since the cam units 16 are arranged in two rows on opposite sides of the power roller 15, the bars 122 are made in two lengths which alternate on the rod 119, the shorter bars 122 being interspersed with the longer bars. Each of the selector bars 122 has a link conection 123 with an extension 124 formed as part of one of the side frames of the cams and release mechanism of the cam units 16. Thus, whenever a cam unit is operated in consequence of the depression of any key 10, one of the selector bars 122 (Figs. 1 and 4) is rocked in a counterclockwise direction.

The selector bars 122 are provided with one or more lugs like 122a, 122b, 122c * * * 122f (Fig. 3) each designed to be engageable with at least one of three bails which selectively control the operation of the escapement mechanism. Each bail comprises a tube 125 mounted on side arms 126 (Figs. 2 and 3) which are pivotally mounted on studs 127. These studs are carried by arms 128 the hubs of which are rigidly mounted on and near the ends of a shaft 129. This shaft is rotatably mounted on studs carried by the base 14 of the machine. The lugs 122a, 122b, 122c, and so on, are so disposed along the length of the selector bars 122 that one or more of the bails including tube 125 will be rocked counterclockwise about studs 127 as a pivot (Fig. 3) whenever the bars 122 are operated in consequence of the depression of a character key 10.

The bars 122 are guided near the mid-points of the longer bars and adjacent the ends of the shorter bars by means of a comb 131 which is secured to the lower edges of the base 14. Adjacent the rod 119, the bars 122 are guided by a comb 132 which is formed with side arms 132a attached to hubs fixedly mounted on the rod 119. Pivotally mounted on the rod 119 near the center of the machine are three levers 133, 134, 135 which extend forwardly or to the right in Fig. 3 to overlie the tubes 125. The levers 134, 135 are curved downwardly at their forward ends whereby lever 134 may be operated only by the right hand tube 125 and the lever 135 only by the middle tube 125. The end of the lever 133 is straight and is operated only by the left hand tube 125. It will be seen that each time one of the selector bars 122 is rocked in a counterclockwise direction (Fig. 3) one or more of the levers 133, 134, 135 will be similarly rocked about rod 119 as a pivot.

The clockwise restoring movement of the bails including the tubes 125 and arms 126 is limited by means of two brackets like 136 (Figs. 2 and 3) secured to the inside faces of the base 14. Each bracket 136 extends horizontally underneath the arms 126 and is provided with a resilient facing 138 of material such as leather and each of the arms 126 rests on the top surface of the adjacent resilient facing 138. The tubes 125 are held upwardly slightly clear of the lugs 122a, 122b, etc. whereby the clicking noise which would result if arms 126 were to directly strike the lugs 122a is silenced.

Each of the levers 133, 134, 135 (Fig. 3) extends rearwardly or to the left of the rod 119 and supports arms 139, 140, 141 (see Fig. 6 also) which are pivoted on studs 142 carried by the levers 133, 134, 135, respectively. Each of the arms 139, 140, 141 has a bent-over lug 143 which cooperates with the upper edge of the rear end of the corresponding lever 133, 134, 135 and these lugs are normally held in contact with said levers by means of torsion springs 144 interposed between pins carried by the arms 139, 140, 141 and pins carried by the levers 133, 134, 135. These levers are urged in a clockwise direction by means of springs 145 anchored to pins carried by said levers and ears formed in bracket 120. The arms 139, 140, 141 have link connections 146 to arms 147, 148, 149, respectively (Figs. 3, 4, 6 and 8) which are pivotally mounted on the front sides of the rocker plates 106 of the several escapements. It is evident that when one or more of the levers 134, 135, 136 is rocked in a counterclockwise direction (Fig. 3), one or more of the links 146 will be drawn downwardly thereby rocking the corresponding arms 147, 148, 149 downwardly, or clockwise in Fig. 6, which shows only the arm 148 for the middle escapement mechanism.

Secured to the rear end of frame 46 (Figs. 3 and 4) is a bracket 150 having a horizontal slot into which extends a stud 151 on a bar 152. This bar at its forward end (Figs. 3, 4, 6, 7, and 8) is pivotally connected to one arm of a bell crank 153 pivotally mounted on a bracket 153a secured to rail 28. The bell crank 153 has a link connection 154 to the movable frame including the universal bar 31. A spring 155, anchored to a pin carried by the bar 152 and to a pin carried by the bracket 150, holds the bar 152 in the rearward or retracted position best shown in Figs. 3 and 4. In order to permit the bar 152 to move to the right in Figs. 3, 7, and 8, or forwardly in Fig. 4, independently of the universal bar 31, the link 154 has a slotted connection to the universal bar frame. The bar 152 through most of its length is L-shaped in vertical section and on the top surface of the horizontal portion of said bar there is secured three screw studs 156 (Figs. 4, 6, and 8) located in the rear of and slightly below the ends of the arms 147, 148, 149, respectively, whereby the bar 152, if operated alone, will not affect any of the arms 147, 148, 149.

With the bails comprising tubes 125 and arms 126 in the position shown in Figs. 2 and 3, depression of any character key 10 causes the corresponding cam unit 16 to be rocked by the power roller 15 in a clockwise or counterclockwise direction (Fig. 2), according to whether the operative cam unit is in the left hand or right hand row, respectively, thereby rocking the corresponding bar 122 in a counterclockwise direction (Figs. 2 and 3) and at the same time operating the corresponding type bar 21. Through the intermediary of one or more of the lugs 122b, 122d, 122f, the bar 122 which corresponds to the key depressed will be rocked in a counterclockwise direction thereby similarly rotating one or more of the bails comprising the tubes 125 and arms 126. One or more of the levers 133, 134, 135 and their corresponding arms 139, 140, 141 will be rocked in the same direction thereby, through links 146, rocking the corresponding arms 147, 148, 149 downwardly or clockwise in Fig. 6. The operated arms 147, 148, 149 are thus brought into the paths of movement of the studs 156, this operation taking place before the operated type bar strikes the universal bar 31. For example, the bar 122 for the "Q" key 10, shown in front in Fig. 4, has a lug 122f whereby only the lever 134, arm 141, and arm 147 are operated with the parts in the positions shown in Fig. 3.

When the type bar ultimately strikes the universal bar 31, the latter is moved rearwardly or to the left in Figs. 2 and 4 thereby, through the link 154, rocking the bell crank 153 clockwise. This results in the bar 152 moving forwardly (Fig. 4) or to the right in Fig. 3. Those of the arms 147, 148, 149 which have been drawn downwardly will be engaged by the corresponding studs 156 and, as a result, the rocker plates 106 connected to said arms will be rocked counterclockwise in Fig. 4.

Upon the restoration of the type bar, the bar 152 is restored by spring 155 to the position of Figs. 3 and 4, this operation taking place during the first part of the restoring movement of the type bar and being completed by the time the type bar has receded a short distance from the printing point. With continued restoring movement of the type bar, the bails comprising tubes 125 and arms 126 and the operated levers and arms 133, 134, 135 and 139, 140, 141, respectively, will be restored to the position of Fig. 3 thereby restoring the operated arms 147, 148, 149 to the position shown in Fig. 6. It will thus be seen that one or more of the escapement ratchets 48, 49, 50 will be operated each time a type bar is operated with the result that the carriage will be permitted to move a distance depending upon the spacing of the teeth in the operative escapement ratchets 48, 49, 50.

The description up to the present time has assumed that the type basket is in elevated position to cause the lower case characters to be printed. Many of the upper case letters of the alphabet are considerably wider than the corresponding lower case letters, particularly when type faces like those used in the printing of newspapers and books are employed. Thus, the upper case "L" is considerably wider than the lower case "l". In order to take care of these differences in width between the upper and lower case characters, means is provided to shift the bails comprising the tubes 125 and arms 126 rearwardly of the machine or to the left in Figs. 2 and 3 to cause the tubes 125 to register with lugs 122a, 122c, 122e on selector bars 122.

An arm 157 (Fig. 3) is secured to the shaft 129 and has a link connection 158 to an arm 159 secured to the shaft 36 which it will be recalled is rocked counterclockwise each time the type basket 32 is drawn downwardly to the upper case position. Whenever the type basket is shifted to the upper case position, arm 159 is rocked counterclockwise thereby, through the link 158, rocking arm 157, the shaft 129, and the arms 128 in a clockwise direction. The bails comprising tubes 125 and arms 126 are thus drawn rearwardly, or to the left in Fig. 3, to re-position the rods to register with lugs 122a, 122c, 122e. In most cases the spacing of the characters is increased when the upper case characters are printed. However, this may not be invariably the case as the extreme left hand or rear row of keys (Fig. 1) often contains combinations of characters such as parentheses and numerals which may require that the spacing be reduced for the characters printed with an accompanying upper case shift movement.

The space bar 10c (Figs. 1 and 2) controls a cam unit 16a (Fig. 7). This cam unit, through a link 18a, operates a bail 160 pivoted on rod 12, and a link 161 connected to an arm 171 (see Fig. 8 also) secured to a shaft 172 which is rotatably mounted in frame 121. Also secured to shaft 172 is an arm 173 (Figs 3, 4, 6, 7, and 8) which extends upwardly to one side of the plane of the lever 153 and has a pin 174 extending into the plane of lever 153. A spring 175, connected to the arm 173 and to a fixed part of the framework, holds the lever 173 in the position of Figs. 4 and 7. When the space bar 10c is depressed, its cam unit 16a causes the bail 160, to which the link 161 is connected, to rotate in a clockwise direction (Fig. 8), thereby drawing link 161 toward the front of the machine in consequence of which the arm 173 is rocked counterclockwise in Figs. 4 and 7 to rock lever 153 in a clockwise direction. This causes the bar 152 to move to the right (Fig. 4). There is a selector bar 122 (Fig. 2) associated with the space bar cam unit 16a and this selector bar operates the bail 125—126 and arm 133 which controls the arm 148 causing the latter to be drawn downwardly. Thus the carriage may be spaced without operating a type bar.

In order to permit justification to be accomplished an improved justification indicator is provided for measuring and indicating the amount each line is typed short of or beyond the desired right hand margin. This indicator is shown in Figs. 1, 2, and 9 to 12, inclusive. Secured to the front cover plate 190, Figs. 1, 2, and 9 to 11, is a semi-circular dial plate 191 which is spaced from the cover plate by means of blocks 192. The dial plate 191 (Figs. 1 and 10) has its outer edge graduated at intervals equivalent to one unit of spacing, i. e., the theoretical unit of feed of the carriage. In the machine disclosed herein the unit of feed of the carriage is .022" although the smallest feed which it is possible to obtain is two units or .044". The dial 191 has an arbitrary zero mark which corresponds to the desired right hand marginal position of the carriage. Secured in a hole in the dial plate 191 (Fig. 11) is a ball race 193 in which is rotatably mounted on two rows of balls 194 a stub shaft 195. A washer 195a and lock nuts 195b on a threaded portion of stub shaft 195 hold the stub shaft and balls 194 in their proper relation in the ball race 193.

Integral with the stub shaft 195 is a pointer 196 (see Figs. 2, 9, and 10 also) and a gear 197. The pointer 196 is located behind the dial plate 191 in the space between the dial plate and the front cover plate 190. When the carriage is in the right hand marginal position, pointer 196 extends directly upwardly to a point above the upper edge of the dial plate and at this point is bent U-shaped so as to have a downwardly projecting portion 196a in the plane of the dial plate, but not quite touching the edge thereof. In this position of the carriage, the pointer coincides with the zero mark on the dial plate. By constructing the dial plate and pointer in this fashion the effect of parallax is avoided.

Secured on the front plate 190 (Figs. 2, 9, 10, and 11) is a stud 198 on which is rotatably mounted, by means of two rows of balls 199, a hub 200 internally constructed somewhat similary to the ball race 193. The stud 198 has a shoulder 198a which retains the right hand row of balls 199, while a washer 201 on the other end of stud 198 retains the left hand row of balls 199. Two lock nuts 202, on a threaded portion of the stud 198, in cooperation with the washer 201, prevent the hub 200 from slipping off the end of stud 198. Secured to the hub 200 is a gear sector 203 meshing with the gear 197.

The gear sector 203 is operated by the carriage in its letter spacing movement through a train of connections to the right hand marginal stop which is designated 103b in Figs. 2, 5, 9, and 12. The marginal stop 103b is adjustably mounted on the marginal stop rack 104 which is secured in the carriage end plates 26.

A square rod 206 is slidably mounted in brackets 207 secured to the rear rail 26. Rigidly mounted on the right hand end of the rod 206 (Figs. 9 and 12) is a plate 208 projecting upwardly into the path of the marginal stop 103b. The left hand end of the rod 206 is flattened at 206a to provide a relatively long, but thin, bearing edge shaped like the blade of a hatchet, engaging a pin 209a on an arm 209 secured to a shaft 210. This shaft is journaled in brackets 211, 212 secured to the under-side of the rear rail 28 and to the frame 13, respectively. Secured to the forward end of the shaft 210 is an arm 213 connected by a link 214 to the gear sector 203.

With reference to Figs. 9 and 12, it is evident that, during the movement of the carriage to the left to type a line, the marginal stop 103b will eventually strike plate 208 as shown and move rod 206 to the left with the carriage. Through the train of connections including arm 209, shaft 210, arm 213, and link 214, the gear sector 203 will be rocked counterclockwise (Fig. 10) thereby rotating the indicator pointer 196 clockwise in that figure. The pointer starts to turn when the carriage is approximately thirty-five units short of the right hand marginal position, that is, within .77" of the marginal position. This is, of course, arbitrary, as the unit of spacing, the point of becoming operative of the indicator, and the number of scale divisions may be changed as desired.

Justification is effected by mechanism the bulk of which is mounted on the left hand side of the machine (Fig. 1) and is mainly supported by a casting 220 (Figs. 1, 4, 5 and 6). This casting has ears 220a, 220b rotatably supporting a manually settable assembly which includes two relatively movable dials 221, 222, each graduated, whereby the dials may be set to predetermined values in reference to index marks 223, 224. Index mark 223 is placed on dial 222, while the index mark 224 is placed on the casting 220. Dial 221 is relatively coarsely graduated and the graduations are designated with the letters A, B, C, etc. Dial 222 is graduated at shorter intervals than dial 221 and the graduations are designated 0 to 30, with the numerals placed opposite every fifth graduation. Index mark 223 is placed upon a pin 223a which projects from the side of the dial 222, while index mark 224 is placed upon a bracket 224a secured to the casting 220.

With reference to Fig. 4, which shows a horizontal section through the common center of the dials 221, 222, it will be seen that the dial 221 is secured to a hub 225 which is rotatably mounted upon a rod 226. The latter is rotatably mounted within the bore of a tube 227. Secured to this tube 227 is a hub 228 having a turned-down portion rotatably mounted on the ear 220a of casting 220. The hub 225 is provided with a lug 225a adapted to register with any one of sixteen slots 228a milled in the hub 228 radially of the rod 226 whereby the dial 221 may be keyed to dial 222 in any of sixteen positions. For this purpose, there is provided a hand-wheel or knob 229 which is secured to a tubular portion 225b of the hub 225 on which is secured the dial 221. Loosely mounted on rod 226 is a shouldered bushing 226a interposed between the end of which and the end of the tubular portion 225b is a spring 230. The bushing 226a loosely fits within the bore of the hub of which the knob 229 is part and, by pressure of the spring 230 against the end of the tubular portion 225 urges the dial 221 into engagement with the dial 222 whereby, if the lug 225a registers with one of the notches in hub 228, the dials 221, 222 will be keyed together. A stud 226b screwed into the end of shaft 226 acts as a stop to prevent movement of bushing 226a under the influence of spring 230.

When the parts are in this relation, the dial 222 will be rotated whenever the knob 229 is rotated. However, when it is desired rotatively to set the dial 221 relative to the dial 222, the knob 229 is pulled outwardly, or downwardly in Fig. 4, to withdraw the lug 225a from the slot with which it registers. The dial 221 may then be rotatably set with reference to the index mark on the pin 223a without turning dial 222. Pins 221a, 222a on dial 221 and dial 222, respectively, prevent turning of dial 221 more than 360° relative to dial 222.

The letters of the alphabet etched upon the dial 221 serve as a code to avoid confusion with the numerals engraved upon the dial 222 and designate the number of spaces between words in a typewritten line. For example, the letter A designates one space; the letter B, two spaces; the letter C, three spaces; and so on. If a typewritten line contains, say, three spaces between words, that is, the line has four words, the dial 221 will be rotated relative to dial 222 until the letter C registers with the index mark on pin 223a. In this manner, the justification control unit is set in accordance with the number of spaces between words in a typewritten line.

After this setting has been effected, the dials 221 and 222 may be rotated as a unit to set the dial 222 according to the number of units of spacing the line is short of the marginal position as determined by the pointer 196 (Fig. 10). Thus, with a single manual control element, the justification mechanism can be set according to the two essential values for justification of a given line, namely, the degree of shortage of the line and the number of spaces in the line.

The hub 225 is slidably keyed to the shaft 226 by means of a pin 231 (Fig. 4) which fits tightly in a transverse hole in shaft 226. This pin also loosely slidably fits in a slot milled radially of the hub 225 whereby said hub and dial 221 may be moved longitudinally of the shaft 226 yet may rotate the shaft 226 relative to tube 227 when dial 221 is moved relative to the dial 222.

The tube 227 extends through a hole in the ear 220b of the frame casting 220 and is rotatably mounted in ear 220b by means of a hub 232 secured to said tube, said hub having a shoulder which rotatably fits a hole in the casting 220. The rod 226 extends completely through and beyond the end of the tube 227 and at its rear end has secured thereto a hub 233.

Secured to the hub 232 is a pair of escapement ratchets 234 with which cooperate escapement pawls 235 (Figs. 4, 5, 6, and 8). These pawls are rotatably and slidably mounted upon a stud 237 mounted on the ear 220b of the casting 220. Also rotatably mounted on the stud 237 is a pawl operating lever 238 (Figs. 5 and 6). A feed spring, like a clock spring, designated 239 (Figs. 4 and 8) has one end anchored to the hub 232 while the other end is anchored to one of the lugs 240a of a spring-retaining plate 240 which is secured to the ear 220b. The lugs 240a are bent at right angles to the plate 240 and are disposed in a circle concentric with the hub 232 to retain the spring 239. This spring tends to rotate the hub 232 and hence the assembly including the dials 221, 222 in a clockwise direction with reference to Figs. 1 and 8, or counterclockwise with reference to Figs. 5 and 6.

The pawls 235 each cooperate with one of the ratchets 234 and are slotted so as to be not only rotatably mounted upon the stud 237, but also capable of a small amount of vertical sliding action with reference to Figs. 5 and 6. Springs 241, anchored to lugs formed in the pawls 235, tend to slide said pawls upwardly with reference to Figs. 5 and 6 and also tend to rock the pawls clockwise into engagement with their respective ratchets 234. The ratchets 234 are displaced relative to each other one half of a tooth space whereby normally one of the ratchets 234 will engage the end of the corresponding pawl 235 and, due to the superior force of spring 239, press the pawl downwardly against the stud 237, as shown by the foremost pawl 235 in Figs. 5 and 6. The spring 241 for the other pawl 235 holds this pawl upwardly with its nose halfway between two teeth on the associated ratchet 234. The assembly including the dials 221 and 222 is thus held against rotation under the influence of the feed spring 239.

The particular pawl 235, for instance, the foremost one as shown in Figs. 5 and 6, which is holding its ratchet 234 against rotation, has its tail held in the path of a lug 238a formed in the pawl-operating lever 238 which is pivoted upon the stud 237. The other pawl, however, is held up by its spring 241 whereby its tail clears the lug 238a. With the parts in the position shown in Figs. 5 and 6, rotation of the pawl-operating lever 238 in a counterclockwise direction, by means hereinafter to be described, causes the foremost pawl 235 to be rocked in the same direction by engagement of the lug 238a with the tail of said pawl whereby the latter is disengaged from its ratchet 234. The ratchets 234 are now permitted to rotate the extent necessary to push the other pawl 235 downwardly to engage the upper wall of a slot embracing stud 237. The parts are so proportioned that with each operation of the lever 238, the ratchets 234 rotate in a counterclockwise direction (Figs. 5 and 6) half the distance between two successive teeth on either ratchet. As soon as the foremost pawl is disengaged from the foremost ratchet 234 (Figs. 5 and 6) its spring 241 draws it upwardly until stopped by the lower wall of the slot therein striking the stud 237 and this pawl then engages the next tooth of its ratchet 234.

The movement of the rearmost pawl in Figs. 5 and 6 downwardly brings its tail into the position of the pawl now indicated by the foremost pawl (Figs. 5 and 6). Since at the time the rearmost pawl (Fig. 5) is being moved downwardly by its ratchet 234 the lug 238a is in the path of downward movement of said pawl, the lever 238 is pivoted on stud 237 by means of a slot similar to the slots in pawl 235. This lever 238 is urged in a clockwise direction by means of a spring 242 anchored to a fixed part of the framework and to an ear formed in lever 238. This slot permits the lever 238 to have a clockwise component of movement downwardly against the tension of spring 242 to avoid obstructing the movement of the rearmost pawl (Figs. 5 and 6) when it is moved downwardly by the rearmost ratchet 234. Upon the next operation of the lever 238 the rearmost pawl (Figs. 5 and 6) will be rocked out of engagement with its ratchet and the foremost pawl will be moved downwardly, thereby permitting the ratchets 234 to rotate another increment in a counterclockwise direction. Thus, the pawls 235 are alternately effective to allow the ratchets 234 and the assembly to which they are secured, which includes the dials 221, 222, to rotate increments equal to half the distance between the teeth on the ratchets.

While the machine is in operation to type a justified line, the entire assemblage of parts mounted upon tube 227 and the rod 226 rotates as a unit under control of the pawls 235 since once the dials have been set in relation to each other, the shaft 226 is keyed to the tube 227.

The automatic justification of lines is controlled by means of a series of selector cams which progressively selectively control the variable escapement mechanism through means hereinafter to be described. These selector cams, designated 243 to 250, inclusive (Figs. 1, 4, 5, 6, and 8) are supported by the tube 227. The cams 243 and 244 (Fig. 4) are secured to the hub 233, which, it will be remembered, is secured to the shaft 226 and is loose on tube 227. Cams 249 and 250 are secured to the hub 232 which is secured to tube 227. Thus, the cams 243, 244 are movable relative to the cams 249, 250. Cams 245, 246 (see Fig. 6 also) are secured to a hub 251 which is loosely rotatably mounted upon tube 227. Likewise, the cams 247, 248 are secured to a hub 252 loosely mounted upon tube 227.

Secured to and between the cams 249, 250 (Figs. 4, 5, and 6) is a bail 253 extending parallel with the tube 227 and through the planes of all the cams except the cam 250. Loosely rotatably mounted upon the hubs 233 and 251 (Fig. 4) are arms 254, 255, respectively, each of which projects radially of the tube 227 and has a rectangular slot (Fig. 6) closely embracing the bail 253. The arms 254, 255 are held against displacement longitudinally of the arm of bracket 253 by means of plates 256 having slots embracing the sides of the arms 254, 255 and secured to the bail 253. Thus the arms 254, 255 rotate in unison with the selector cams 249, 250.

The hub 233 (Fig. 4) is part of a gear 257 alongside of which a gear 258 is secured to the hub 251. The gears 257, 258 are of different diameters, the gear 258 being the larger, and these gears are interconnected by a pinion assembly 259 comprising two pinions of different diameters which are rigidly secured together and rotatably mounted on a pin 260 carried by the arm 254.

Considering bracket 253 as fixed for the moment, it is obvious that when the dial 221 is rotated relative to the dial 222 to bring a specified letter into registry with the index mark on pin 223a, the gear 258 will be rotated in the same direction, but a lesser extent, due to the reduction gearing comprising gear 257, pinion assembly 259, and gear 258. Thus the selector cams 245, 246 will be displaced rotatively relative to the cams 243, 244, but their net displacement upon the tube 227 will be less than gear 257. In a similar manner, the selector cams 245, 246 and 247, 248 (Figs. 4 and 6) are interconnected by means of gear 261, pinion assembly 262, and gear 263 integral with the hub 252, the pinion assembly 262 being mounted upon a pin 264 carried by the arm 255. The gear ratio between the gears 257, 258, 259 is three to two while the ratio between the gears 261, 262, 263 is two to one. Thus, each time the knob 229 is turned to set dial 221 relative to dial 222, the pairs of cams 243, 244; 245, 246; and 247, 248 are displaced relative to the pair of cams 249, 250, the pair of cams 243, 244 being displaced the greatest extent and the pair of cams 247, 248, the least extent.

The selector cams 243 to 250 control selecting mechanism which is operative during spacing operations between words as a consequence of the depression of the space bar 10c automatically to vary the spacing between certain words by selectively controlling the variable escapement mechanism combinationally. For example, if a line has, say, six words, and is typed quite an appreciable extent short of the marginal position, the cams 243 to 250 will selectively control the escapement mechanism to cause a greatly increased spacing between some or all of the words which spacing may progressively decrease and become constant as the typing of the line proceeds, unless the values of shortage and number of words in a line are such as to make it possible to divide the increased spacing equally among the spaces between the words. Thus, if there is an even number of spaces in a line, that is, an odd number of words, but the shortage is odd or does not divide evenly, the first few spaces between words will be greater than the last few.

Figure 8:
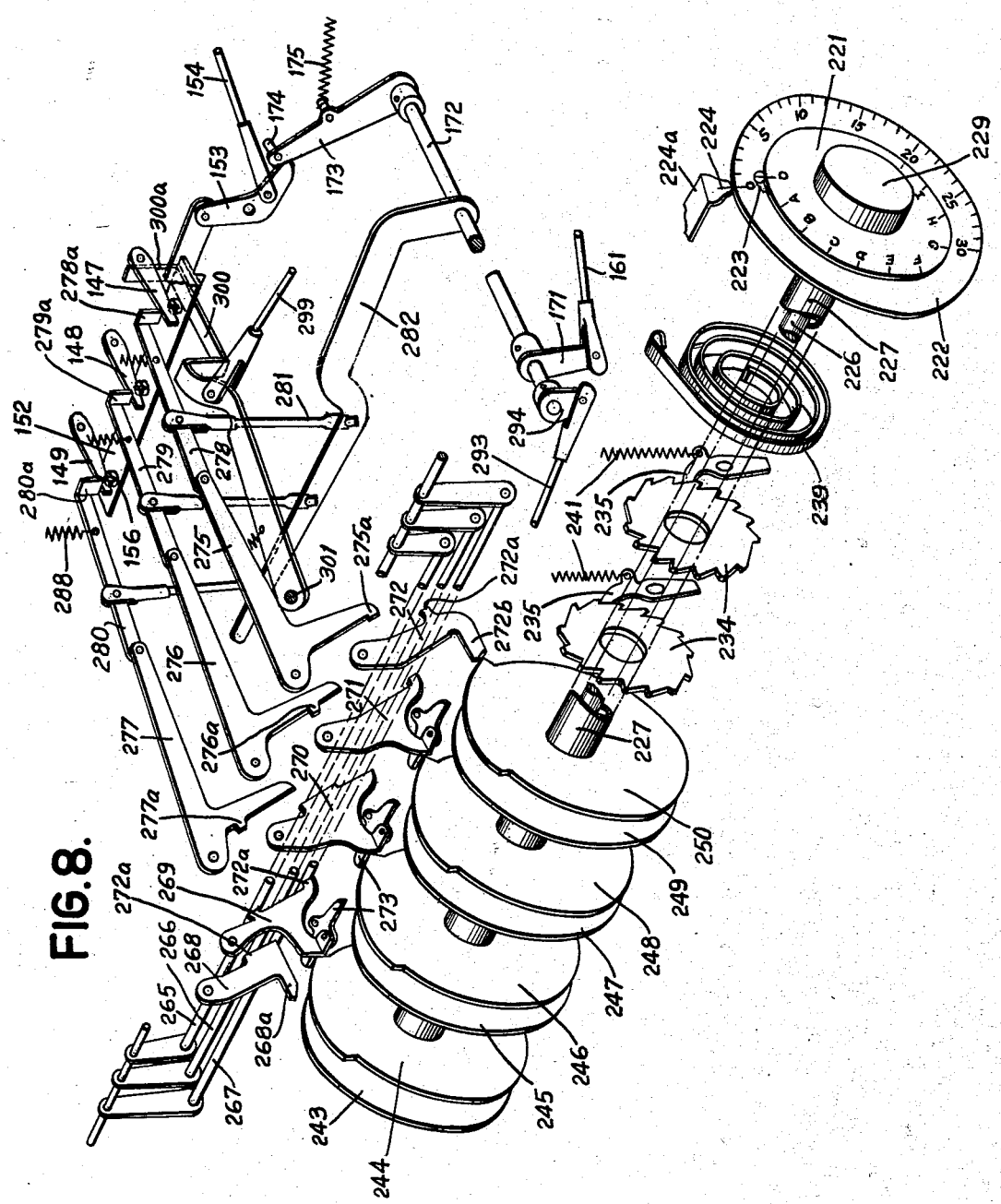
Fig. 8 is a diagrammatic view of the justification control mechanism.

The selecting mechanism controlled by the selector cams is shown diagrammatically in Fig. 8 and in structural detail in Figs. 4, 5, and 6. Pivotally mounted upon a rod 264 (Figs. 5 and 6) supported by the ear 220b and an ear 220c of casting 220 is a series of three bails designated 265, 266, 267, respectively, (see Fig. 8 also) consisting of tubes which are secured to arms pivotally mounted upon rod 264. Mounted upon the rod 264 and spaced by means of short tubes and collars on the rod are five arms designated 268 to 272, inclusive, these arms being loose on rod 264. The arms 268 to 272 cooperate with the cams 243 to 250, respectively. The arms 269, 270, and 271 are located half way between the cams 244, 245; the cams 246, 247; and the cams 248, 249, respectively. Pivoted on the arms 269, 270, 271 are feeler levers 273 which are held in a central position so as to be alined parallel with tube 227 by means of springs 274.

Each of these feeler levers is long enough so that it spans the space between two cams whereby rocking of any one of the arms 269, 270, 271 in a clockwise direction (Fig. 8) will cause the feeler lever associated therewith to be brought into contact with the peripheries of the pairs of cams with which the feeler lever cooperates. The cams associated with any feeler lever may or may not obstruct movement of its feeler lever, depending upon the relative position of the cams associated with such lever. For instance, if the cams 244, 245 (Fig. 8) are in such position with relation to each other that the rises of both cams are directly opposite the ends of the feeler lever 273 on arm 269, the arm 269 will be obstructed from movement in a clockwise direction (Fig. 8). However, if one or the other of these cams is so positioned that the dwell or low point of either cam 244, 245 is opposite the end of the feeler lever, feeler lever 273 will not be obstructed from movement and arm 269 will be permitted to rock. The springs 274 which hold the feeler levers in the neutral position also tend to rock the levers 269, 270, 271 in a counterclockwise direction (Fig. 8) or clockwise (Figs. 5 and 6) and thus tend to restore said arms.

It will be noted, with reference to Figs. 5, 6, and 8, that the levers 268 to 272 are provided with lugs 272a in various positions and of various dimensions, these lugs engaging one or more of the tubes forming the bails 265, 266, 267. The arm 268 has a long lug engaging the bails 266, 267. The arm 269 has two lugs 272a engaging the bails 265, 267. The arm 270 has a long lug engaging the bails 265, 266. Arms 271, 272 have short lugs in position to engage the bails 267, 266, respectively.

Pivotally mounted upon the rod 264 (Figs. 4, 5, and 6) are three levers 275, 276, 277. The levers 275, 276, 277 have short arms provided with lugs 275a, 276a, 277a cooperating with one of the bails 265, 266, 267 at the side opposite to the lugs 272a. The lug 275a on lever 275 cooperates with the bail 267 (Fig. 6) while the lug 277a on lever 277 cooperates with the bail 265. The lever 276 has its lug 276a in position to cooperate with the middle bail 266. It is evident that whenever one of the levers 275, 276, 277 is rocked in a clockwise direction (Fig. 8) or counterclockwise (Fig. 6) one or more of the arms 268 to 272 will be rocked in a clockwise direction through the interposition of the bails 265, 266, 267 between the levers 275, 276, 277 and the arms 268 to 272.

It will be noted with reference to Figs. 5, 6, and 8 that each of the selector cams 243, 250 has a high portion extending over approximately one-quarter of the periphery of the cam. This high portion, as well as the low portion extending over the remaining three-quarters of the periphery of the cam, is of constant radius. The pairs of cams such as 243, 244 are rigidly secured to their respective hubs so that the high portions are displaced approximately 90° with respect to each other, as best illustrated in Figs. 5 and 6. It will be noted in Fig. 5, for example, that the rearmost cam 249 of the pair 249, 250 has one end of its low portion in alinement axially of tube 227 with one end of the high portion of the other cam 250 of the pair.

When the dials 221, 222 are set as in Fig. 8 so that the zero marks thereon register with the index marks on the pin 223 and the bracket 224, respectively, the ends of the low portions of the cams 243, 245, 247, and 249 and the adjacent ends of the high portions of the cams 244, 246, 248, and 250 are directly opposite the projections 268a, 272a, and the ends of the levers 273. This permits the arms 268 to 271 to rock clockwise with reference to Fig. 8, or counterclockwise with reference to Figs. 5 and 6. However, the tooth 272b of the arm 272 is so located that this tooth cooperates with one end of the high portion of the cam 250 whereby arm 272 is prevented from rocking in a clockwise direction. These positions of the cams 243 to 250 will be referred to hereinafter as the normal positions because the machine is thereby conditioned for normal spacing between words. Thus, in the normal, or zero, positions of the dials 221, 222, arm 272, bail 266 and the lever 276 remain fixed and incapable of clockwise rotation with reference to Fig. 8, or counterclockwise rotation with reference to Fig. 5.

Fig. 8 shows the normal position of selector cams 243 to 250 and dials 221, 222 while Figs. 1, 4, 5, and 6 show the positions of the cams 243 to 250 when dial 221 is set at zero and dial 222 at 12. In the normal position of dials 221, 222, spring 239 holds the ends of arms 254, 255 in engagement with a resilient stop which may take the form of short sections of rubber tubing 220d on a rod 220e (Figs. 1, 5, and 6) supported by the ears 220b, 220c of casting 220. When the dial 221 is rotated relative to dial 222, the pairs of cams 243 to 248 will be rotated variable extents relative to cams 249, 250 whereby the high points on cams 243, 245, 247, 249 become displaced in spiral relationship in a clockwise direction (Fig. 8). Thus, the relationship of the cams 243 to 248 to the feeler levers 273 and arms 268, 272 is changed extents dependent upon the number of spaces between the words in a given line. When the dials 221, 222 are locked together and the entire assembly mounted on the tube 227 is rotated as a unit, the relationship of all of the cams to the feeler levers 273 and the relationship of the cams 243 to 250 to the arms 268 to 272 is further changed but the relation of the cams to each other remains the same.

As the typing of a line proceeds, the cam assembly rotates one step for each space between words and thus changes with each space bar operation the relation of the cams to the arms 268 to 272.

When one or more of the levers 275, 276, 277 is held rigid, it effects the operation of selector arms 278, 279, 280 (Figs. 1, and 4 to 8) associated with the levers 275 to 277, respectively. Each arm 278, 279, 280 has a link connection 281 (Figs. 4, 7, and 8) to an arm 282 loosely mounted on the shaft 172. The arm 282 is drawn downwardly in consequence of the operation of the cam unit 16a controlled by the space bar 10c with each space bar operation to space two successive words. In order to effect this operation of the arm 282, there is secured to the shaft 172 an arm 283 (Figs. 4 and 7) to which is pivoted a link 284. The link 284 has a portion thereof resting upon a roller on a stud 285 on the arm 282 whereby, when the link 284 is rocked counterclockwise by depression of its left hand end (Fig. 7), the arm 282 will likewise be rocked counterclockwise. The link 284 has a downwardly and rearwardly projecting portion 284a having cam surface 284b in contact with a roller 286 on a stud 287 carried by a fixed part of the framework.

Upon each spacing operation the arm 283 is rocked counterclockwise (Fig. 7) thereby moving the left hand end of link 284 to the left. In consequence of the shape of the cam surface 284b the link 284 is caused to rock in a counterclockwise direction, thereby, through contact with the roller on stud 285, rocking the arm 282 downwardly. This pulls downwardly all of the links 281 and thereby tends to rock in a clockwise direction (Fig. 8) all of the arms 278, 279, 280. If any of the levers 275 to 277 are held rigid in consequence of the engagement of one of the arms 268, 272 with the high portions of cams 243, 250 or any of the feeler levels 273 with the cams 244 to 249, one or more of arms 278, 279, or 280 will be rocked clockwise instead of counterclockwise, thereby depressing the right hand end of said arm.

The arms 278, 279, 280, as shown in Figs. 4, 6, and 7, are guided in slots formed in the bracket 150 and have bent-over lugs 278a, 279a, 280a (see Fig. 8 also) overlying the ends of arms 147, 148, 149 which, it will be remembered, are pivotally mounted on dog rocker plates 106. Thus, if one or more of the arms 278, 279, 280 is rocked in a clockwise direction (Fig. 8) as a consequence of the rigidity of one or more of the levers 275, 276, 277, the corresponding arms 147, 148, 149 will be depressed into the path of studs 156 whereby the magnitude of the carriage feed with each spaced bar operation will depend upon how many and which ones of the arms 147, 148, 149 are operated.

The arms 278, 279, 280 are restored by means of springs 288 (Figs. 4, 6, 7, and 8) which are anchored to pins carried by a plate 289 adjustably mounted on the bracket 150 by means of screws 290. The plate 289 thus acts as an adjustable stop limiting upward or counterclockwise movement (Fig. 8) of the arms 278, 279, 280.

The lever 238, which operates the pawls 235 (Figs. 4 to 7), is operated by a lever 291 which is pivoted on a stud 292 carried by a fixed part of the framework. The lever 291 has a link connection 293 to an arm 294 secured to the shaft 172. Upon each operation of the space bar, shaft 172 and arm 294 are rocked in a counterclockwise direction (Fig. 7) thereby similarly rotating the lever 291. The longer arm of lever 291 overlies the end of lever 238 thereby causing the lever 238 to rock counterclockwise (Figs. 5 and 6) with each space bar operation. Thus, after each space bar operation, the relationship of the cams 243 to 250 to the arms 268 to 272, inclusive, is changed automatically.

Since the cam assembly is rotated only one unit for each space between words, the cam assembly may not be completely restored to starting position, that is, zero position when a line of typing has been completely justified. For instance, a line might have seven words, calling for six spaces, but in order to correctly justify the line a considerably greater number of units of spacing may be required, say, fourteen units, in addition to the normal spacing. The teeth on the ratchets 234 are so chosen that the dial 222 moves the distance between two successive graduations, corresponding to one unit of spacing of the carriage with each space bar operation. Thus, if the dial 222 were set to "14" and the dial 221 set to "F" to correspond with six spaces between words, the dial 222 and the cam assembly would only be restored six units so that, at the end of the line, the dial 221 would be in such position that the value "8" would be in registry with the index mark 224. The next line, however, may be only four units short of the marginal position, which means that the dial 222 must be set in the same direction as it moves during the writing of a line. With the pawls 235 still engaging the ratchets 234, this is obviously impossible without some means of releasing the pawls 235 before the next line is justified.

Conveniently, the resetting of the dial 222 and the cam assembly to zero is automatically effected upon a carriage return operation which is always incidental to the writing of a new line. To effect the restoration of the cam assembly to zero, there is provided mechanism which is most clearly shown in Fig. 5. Pivotally mounted on a stud 295 carried by the ear 220a of the casting 220 is an arm 296. This arm 296 has a bent-over lug 296a which is located between the ratchets 234 and the ends of the pawls 235 cooperating with the ratchets 234 whereby, when the arm 296 is rotated in a clockwise direction (Fig. 5), both of the pawls 235 will be rocked counterclockwise and disengaged from the ratchets 234. This arm 296 is connected by a link 297 to the lever 100 which, it will be recalled, is rocked in a clockwise direction (Fig. 5) into the path of the left hand marginal stop 103a each time the carriage return key 10b (Fig. 1) is depressed and is held in this position until the carriage reaches the left hand marginal position, after which the lever 100 resumes the position of Fig. 5, thereby permitting pawls 235 to reengage the ratchets 234. Thus, as a consequence of the depression of the carriage return key, the cam assembly is restored to zero position in readiness for taking a new setting as a preliminary to justifying the next line of typing.

The operation of the space bar, when the dials 221, 222 are set in zero position, causes the carriage to be advanced three units of spacing. There may be times when it is desired to space the carriage independently of the spacing produced by the selective effect of the cam assembly. For this purpose there is provided the key 10d (Fig. 1). This key controls a cam unit 16b (Fig. 7) connected by a link 18b to a bail 298 pivotally mounted on the rod 12 within the bail 160 which is associated with the cam unit 16a controlled by the space bar 10c. The bail 298 is connected by a link 299 to an arm 300 (Figs. 4, 6, 7, and 8) pivoted at 301 to a fixed part of the framework. This arm 300 is pivoted to swing in a horizontal plane and, as shown in Fig. 6, extends through a slot in the bracket 150 and has an upstanding lug 300a projecting upwardly behind the arm 147 as shown in Fig. 8. Each time the key 10d is depressed the cam unit 16b is operated, rocking bail 298 clockwise and drawing link 299 to the right in Fig. 7. This causes the lug 300a to move forwardly or to the right in Fig. 8, thereby actuating the dog rocker plate 106 associated with the escapement ratchet 50. This train of connections to the escapement mechanism is independent of any of the connections between the space bar and the escapement mechanism and is also independent of the cam assembly.

It will be remembered that the arm 272, when the cam assembly is set in zero position, is obstructed by the high portion on cam 250, whereby lever 276 is held rigid while levers 275, 277 are free. Thus, when the space bar is operated in writing non-justified lines or, when writing a justified line, after the cam assembly has reached normal position, the carriage will escape only three units of spacing.

A brief review of the operation of the machine with respect to a specific example will now be given. It will be assumed that a given line has eight words and seven spaces between words and that in initially typing the matter to be justified the draft copy shows the line to be twenty units of spacing short of the desired marginal position. The knob 229 is pulled outwardly and rotated until the letter "G" on dial 221 registers with the index mark on the pin 223a. The knob is then allowed to move inwardly until the lug 225a registers with the slot 228a which corresponds thereto on the hub 228 carrying the dial 222. The knob is now again rotated to position the dial 222 to bring "20" on the dial in register with the index mark 224. This causes the cams 243 to 250 to be set in such relation with the arms 268, 272 and feeler levers 273 that the spacing will be automatically increased between words to the extent necessary to make the line flush with the margin.

Since the value "20" is not evenly divisible by "7", the spacing of the words cannot be effected evenly. The design of the cams, their relationship to each other, and the driving ratios of the gearing interconnecting them is such that as far as possible the spacing between words will be uniform, but, where one or the other of the factors is odd, as in the case of the present example, positioning of the cams causes the first few words of the line to be spaced apart one or more units than the remaining words Thus, the twenty units of spacing of the present example will be divided by the setting of the cams so that two additional units of spacing will be affected between the seven words and the balance of six units may be distributed among the first few spaces between words.

After dials 221 and 222 have been set, the operator proceeds to retype the line from the initially prepared draft. In typing the line, the letters of each word will be typed in proportion to their widths with exactly the same spacing as in the original draft, but each time the space bar is operated the selector cams 243 to 250 will selectively control the movement of the arms 268 to 272 and thereby cause the words to be spaced apart greater extents than in the original draft. With each operation of the space bar 10c, the selector cam assembly is rotated one step thereby automatically changing the relation of the selector cams to the arms 268, 272, and to the feeler levers 273 whereby different ones of the arms 268 to 272 are obstructed or permitted to move according to the successive positions of the cams. Thus, as the typing of the line proceeds, the spacing between the words will progressively decrease under the selective control exercised by the cams 243 to 250.

In the present case, since the dial 222 has been set to "20", it will be reversely rotated only seven spaces and hence will not be completely restored to normal position when the last spacing movement of the line is effective. The next line may be, let us say, six units short of the margin and, since the dial 222 is now registering with "13", it is necessary to turn the dial backwards toward normal position. When the carriage return key is depressed at the end of the line, the mechanism shown in Fig. 5, comprising the arm 100, link 297, and lever 296, becomes automatically operative when the carriage return clutch is engaged, to withdraw the pawls 235 from engagement with the ratchets 234, whereby the selector cam assembly is permitted to rotate in a counterclockwise direction (Fig. 5) under the influence of spring 239 until the arms 254, 255 strike the resilient stops 220d. The dial 222 may now be turned forwardly again to set the value "6" in register with the index mark 224a. It is not necessary to restore the dial 221 each time the dials are to be set in accordance with the factors for a new line as this dial at any time may be rotated in either direction by merely disengaging lug 225a from the cooperating slot 228a and the movement of the dial 221 is limited by stop pins 221a, 222a to slightly less than a full turn. Thus, if the dial 221 previously stood at "J" and it is desired to set it at "B", it is necessary to rotate said dial in a counterclockwise direction (Fig. 1) owing to the obstruction offered by the stop pins 221a, 222a to turning the dial more than a full revolution relative to dial 222. These stop pins are so positioned that when the dial 221 is rotated in a counterclockwise direction (Fig. 1) relative to dial 222, the dial 221 will be stopped with the zero mark thereon in register with the index mark 223a.

When a line is only a few spaces short of the margin and there are a greater number of word spaces, the first few spaces in the line will be typed with increased spacing and the remainder with normal spacing, the selector cams being designed to take care of all conditions which may be met.

The principal advantage of the justification control mechanism herein described is that it does not destroy the appearance of the typed line and produces a master sheet which more closely resembles type-set matter than machines heretofore known in the art.

In printing from hand set types or from slugs cast by machines like the "Linotype" or Intertype," the types or matrices which produce the types are of only such widths as are necessary for the width of the character. Naturally, when the types or matrices are assembled to form a line, the character is printed by the types or the slugs will be spaced in proportion to their widths and will not be evenly spaced apart, which is characteristic of typewriting machines. In the justification of such lines, the compositor inserts an appropriate number of spaces between the words, as by inserting spacers, to cause the line to conform to the desired standard of length.

In machines heretofore designed for effecting justification in typewriting machines, the spacing of each character printed and the spaces between words have all been varied to suit the degree of shortage of the line, but the spacing of each character in a line has always been the same as for the others. In other words, with the standard typewriter pica spacing of $\frac{1}{10}''$, each character is typed with the same spacing increased by the same amount for each character typed to bring the line flush with the margin. Machines have also been designed which space the characters proportionately to their widths, but heretofore such machines have not been designed to effect justification automatically. If the principle utilized to justify typewritten lines, where even spacing is effected, is applied to a machine which variably spaces in proportion to the widths of the letters the good appearance of the copy resulting from simulation of matter printed from hand set type is destroyed because the spacing between all characters will be increased an equal amount, thus many characters will receive too much spacing in comparison with their widths, particularly the narrow characters like "i" and "l".

In the case of the machine disclosed herein, the characters are spaced in proportion to their widths without increasing the spacing in justifying the line and the machine automatically causes the words to be spaced apart in substantially the same way as a type compositor inserts spacers in lines to justify them. Thus, with the present machine, lines are typed with the words and letters spaced almost exactly as in hand set type and the appearance of the words is unchanged. Thus, the present machine gives results which are closer to the results obtainable by hand set type than any machine heretofore known in the art.

In justifying indented lines, such as the first line of every paragraph with prior machines which vary the feed of the carriage with each letter, the spaces necessary to indent the line likewise may vary, since the effect of the escapement mechanism is the same irrespective of whether a character key or the space bar is operated. This condition would be aggravated in the case of the machine herein disclosed since the additional units of spacing necessary to justify the indented lines are distributed among a relatively few spaces instead of being equally divided among both the character spaces and the word spaces. As an example, suppose a line is fifteen units short, has six words, and is to be indented twelve units calling for four operations of the space bar. Furthermore, assume that the fifteen spaces are to be equally divided among the five spaces between words. This requires that three additional units or .066" of space must be added to each of the five spaces between words, that is, the spacing between words has to be doubled in this case in order to justify the indented line. Now to justify this line the dial 221 would have to be set at "E" and dial 222 at "15." In typing the indented line, the spacing will be doubled for the first five space bar operations of which three would be utilized for indenting the line and the remaining two for spacing the first three words. Thus the paragraph would be indented twenty-four units or twelve spaces or .528" instead of .264".

Since the selector cam assembly is still capable of further movement of ten spaces back to normal position, the last three operations of the space bar to space the remaining three words of the line would cause the last three words to be spaced farther apart than necessary whereby the indented line would not justify but would be expanded beyond the marginal position. Thus it would not be possible to justify an indented line or maintain the degree of indentation constant.

The space key 10d and its train of connections to the dog rocker plate 126 associated with arm 147 provides a means whereby the carriage may be spaced for indenting paragraphs and other purposes requiring a uniform spacing notwithstanding the fact that the selector cam assembly may be set to justify such line.

It is possible to use both the space bar 10c and the space key 10d in typing a given line because the justifying control mechanism is independent of the position of the carriage whereby justification can begin at any desired point in a line, that is, in any position of the carriage. The operation of the justification control mechanism is dependent on only two factors, the length of a line as denoted by the amount of deviation from a predetermined standard of length and the number of spaces between the parts of a line, both of which factors are purely mathematical. The actual length of the line or the position of the line is immaterial. Thus the machine may be used to justify quotations which often are indented, or to justify matter bordering illustrations which often requires shorter lines or narrower columns than the bulk of the text, without requiring readjustment of the justification control mechanism other than to set it according to the two factors of line length and number of blank spaces between the parts of a line.

In justifying lines containing matter such as dates and mathematical data which may require a large number of blank spaces for separating the parts thereof, it is necessary to count all blank spaces, except the spaces used to indent a line, to determine the factor for setting the dial 221. Otherwise, particularly if the line is short by quite an appreciable amount of the marginal position, some of the spaces between words may be too great for good appearance as a relatively large space would then have to be distributed among a relatively few spaces between words. Furthermore, if the date or other matter which involves numerals or letters standing by themselves occurs at the beginning of a line and the spaces between them are disregarded, it may happen that the parts of such date may be too greatly separated owing to the fact that the selector cams cause the greatest spacing to be effected at the beginning of a line where the factor of shortage is not evenly divisible by the factor of word spacing. When all the spaces are counted, the additional units of spacing are more evenly divided among the parts of a line and the effect of the increased spacing at the beginning of a line is less noticeable.

It is not necessary, however, that justification be effected by distributing the spacing over the entire line, particularly where the occurrence of numerical data at the beginning of a line might cause the first part of the line to have exaggerated spacing. For instance, in catalogue work and where the first part of the line may be devoted to numerical data descriptive of size, quality, etc. and the reminder of the line may be devoted to a description which must be terminated at the margin for good appearance, it may be desirable to begin justification at some other point than the beginning of a line. This is also true where the number of word spaces in the line or the spaces separating data not expressed in words exceeds the capacity of the dial 221. The dial 221 as described hereinabove, has been stated to have an arbitrary capacity of 16 spaces. Under some conditions there may be a large number of spaces in a comparatively short line making it impossible to set the dial 221 to conform with the number of spaces in the line. A problem of this nature can be easily handled by commencing justification at some other point than the beginning of a line. For instance, the typist, in typing the original draft, can count the number of word spaces from a point in, let us say, the middle of a line and note this fact at the end of the line along with the number of units of spacing the line is short. In retyping the draft, the operator can type up to the point where the justification control is to begin with the justification control mechanism set at zero and set the dials at the middle of the line in accordance with the factors noted on the draft. This procedure requires no greater effort than to observe on the usual scale of the machine when the machine reaches the point at which justification is to commence. This procedure may be utilized to justify long lines having a large number of words whereby the number of word spaces may exceed the capacity of the dial 221.

When there are a great number of word spaces in a line and only a few units are needed to space out the line, dial 221 may be set at a maximum position, say "I" and dial 222 set at the correct number of units, which will justify the line correctly. When the selector cams have rotated so that the high point of cam 250 engages 272b, a word spacing of three units will result regardless of the number of word spaces.

It will thus be seen that the present described invention has the distinct advantage of prior machines in that the point at which justification begins is purely a matter of the whim of the operator and is not dependent upon the setting of any levers or mechanisms connected with the carriage and is not dependent in any way upon the position of the carriage or the length of the line to be justified.

While there has been shown and described and pointed out the fundamental novel features of the invention as applied to a single embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a variable spacing typewriter, a carriage, a plurality of escapement mechanisms for said carriage, means to intercouple said escapement mechanisms to render any of them operable singly or in combination to enable the carriage to be fed a plurality of different extents, a manually settable selector device for selecting the escapement mechanisms for operation, operating means common to the escapement mechanisms for operating any selected escapement mechanisms, and means to cause an operation of the operating means between words.

2. In a machine of the class described, the combination of a series of escapement mechanisms, means to operate said escapement mechanisms singly or in any one of a plurality of different combinations, means to cause an operation of the last named means between character groups such as words; and a selector device for controlling the number of escapement mechanisms in operation, said selector device including two manually settable members one settable to represent a factor of shortage of a line, the other settable to represent the number of words in a line, and means selectively controlled by said members for controlling the selection of the escapement mechanisms for operation.

3. In a machine of the class described, the combination of a carriage, a plurality of similar intercoupled escapements, each for effecting a different feed of the carriage and selectively operable in various combinations, a common operating member for the escapement mechanisms, and a selector device for selectively variably controlling the operation of the escapements by the operating member, said selector device including a plurality of selector elements and a plurality of members for setting said elements to represent factors of justification; and means controlled by said elements for coupling the escapements to said member.

4. In a machine of the class described, in combination with the carriage, variable feed mechanism for the carriage including a series of selectively operable elements, each operable to cause a different feed of the carriage, a space bar, means controlled by the space bar for operating any of said elements, and a justification control device for selectively coupling said elements to the operating means, said justification control device including two manually settable devices, each settable in accordance with one of two justification factors, means controlled by said devices for selectively coupling said elements to the operating means singly or in various combinations, and means controlled by the space bar for operating said devices to cause a progressive change in the selective effect of said devices in coupling said elements to the operating means.

5. In a machine of the class described in combination with the carriage; a plurality of escapements, each escapement effecting a different feed of the carriage; means to intercouple said escapements for operations singly and in various combinations, a space bar, means controlled by the space bar for operating said escapements, selectively operable means to couple the escapements to the operating means; a justification controller for selectively controlling the coupling means including a series of movable stop members, means settable in accordance with one factor of justification to effect displacement of certain of said stop members relative to others, and means settable in accordance with another factor of justification for displacing said stop members together; means controlled by the stop members for selectively actuating the coupling means, and means controlled by the space bar for moving all of said stop members as a unit step-by step to vary progressively the selective control of the coupling means by said stop members whereby to change the spacing movement of the carriage with successive operations of the space bar.

6. In a machine of the class described, in combination with the carriage, typing means and means selectively operable to control the operation of the typing means, variabe feed mechanism for the carriage including a series of separate escapement mechanisms, each for causing the carriage to be fed a different extent, means to interconnect said escapement mechanisms to permit one or more to be operated at a time independently of the others, a common operating member for said escapement mechanisms, selectively operable means to couple said escapement mechanisms to said common operating member singly or in different combinations whereby to cause the escapement mechanisms to be operated singly or combinationally, power means to operate both the operating means and coupling means, means to cause an operation of the power means between character groups such as words; and a justification controller for controlling the operation of the coupling means by the power means, said controller comprising a series of selector elements movable relative to each other to represent one factor of justification, and movable as a unit to represent a different factor of justification, means to move said elements relative to each other to represent the first factor of justification, means to move said elements to represent the second factor of justification, and means controlled by said elements for selectively and combinationally controlling the operation of the coupling means.

7. In a machine of the class described, the combination of a carriage, selectively operable variable feed mechanism for the carriage, means to selectively control the operation of the feed mechanism, a space bar, means controlled by the space bar for operating the feeding mechanism, and a rotatable device for controlling the selective controlling means, said rotatable device including a plurality of control elements movable relative to each other, means to variably displace said control elements relative to each other to represent one factor of justification, means to move all of said control elements as a unit to represent a second factor of justification, and means controlled by the space bar for moving said control elements as a unit to progressively vary the effect of the feeding means on the carriage during successive operations of the space bar.

8. In a machine of the class described, the combination of a series of similar intercoupled escapement mechanisms selectively operable singly or in various combinations, means to operate the escapement mechanisms, means to couple the escapement mechanisms to the operating means singly or in combination, means to actuate the coupling means selectively; and a rotatable escapement control device for controlling the means for operating the coupling means, said control device including a series of controlling elements each rotatable relative to the others, means to couple said elements together to enable said elements to be rotated relative to each other progressively decreasing extents, means to rotate said elements an extent to represent a factor of justification, means to rotate said elements as a unit to represent a different factor of justification, and means to rotate said elements as a unit to progressively change the selective actuation of the coupling means.

9. In a justifying typewriter, a carriage, a series of escapement mechanisms, each for controlling the feeding of the carriage; means to intercouple said escapement mechanisms to enable the escapement mechanisms to be selectively operated singly or in combination to cause a plurality of different feeds of the carriage greater in number than the number of escapement mechanisms; a common operating member for the escapement mechanisms, power means to operate said member, means to initiate operation of the power means; means to couple the escapement mechanisms to the common operating member selectively and combinationally, including a power operator common to all of the coupling means and operated by the power operating means; and a selector unit for controlling the operation of the coupling means, said selector unit including a series of movable stop members cooperating with the coupling means, said stop members being movable relative to each other to condition such stop members to selectively and combinationally control the operation of the coupling means, means to move said stop members relative to each other according to a factor of justification, means to move all of said members as a unit an extent proportional to a second factor of justification to preset the selector unit to justify a line; and means operated by the power means and controlled by the initiating means moving the selector unit as a whole between character groups whereby to progressively change the selective control exercised upon the coupling means by said selector unit during the course of the typing of a line.

10. In a justifying typewriter, a carriage, a plurality of separate feed mechanisms for said carriage, each of said feed mechanisms causing the carriage to be fed an extent different from the other feed mechanisms, means to intercouple said feed mechanisms to enable the feed mechanisms to be operated singly or in any one of a plurality of different combinations to cause the carriage to be fed a number of different fixed extents greater than the number of feed mechanisms, a common operator for the feed mechanisms, power means for operating the common operator, a series of coupling elements each associated with one of the feed mechanisms and operable to couple the associated feed mechanism to the common operator, power means common to all of the coupling elements for actuating said elements; and means to control the effect of the power means upon the coupling means including a series of levers equal in number to the number of feed mechanisms and a series of movable stop members exceeding in number the number of feed mechanisms, and means interposed between said stop members and levers for combinationally controlling the operation of said levers according to the positions of the stop members.

11. In a justifying typewriter, a carriage, a series of feed mechanisms for the carriage, each feed mechanism causing the carriage to be fed an extent different from the others, means to couple the feed mechanisms together to enable the feed mechanisms to be operated singly and in different combinations whereby a greater number of feeds of the carriage may be obtained than the number of feed mechanisms, means common to all of the feed mechanisms for operating said feed mechanisms, a series of coupling elements each associated with one of said feed mechanisms for coupling its feed mechanism to the common operating means, a series of normally ineffective actuating devices each corresponding to and adapted to actuate one of the coupling elements, means common to all of the actuating devices for operating said devices, means including an operation initiating member to cause an operation of both of said operating means; and a selector device for selectively and combinationally rendering the actuating devices effective including a series of stop members movable relatively to each other, said stop members being variably selectively settable relative to each other to selectively render the actuating devices effective singly and in various combinations, a movable support for said stop members, means to move said stop members relative to each other an extent proportional to one factor of justification and means to move said support proportionally to a second factor of justification, and means automatically operative with both operating means for moving said support whereby to progressively vary the selective control exercised upon the actuating devices by said stop members.

12. In a machine of the class described, the combination of a carriage, a series of feed mechanisms, each for effecting a feed of the carriage different from the other feed mechanisms, means to couple the feed mechanisms together to render the feed mechanisms operable singly or in any one of several different combinations to enable the carriage to be fed a number of different extents greater than the number of feed mechanisms, power operating means common to all of the feed mechanisms, means individual to the feed mechanisms for coupling the latter to the power means, power means for actuating the coupling means; and means to selectively and variably control the operation of the second power means including a series of relatively movable control members for causing the coupling means to be selectively combinationally actuated by the second power means, means common to all of said members for moving said members different extents according to one factor of justification, and means to move the relatively movable members as a unit to correspond with a second factor of justification.

13. In a machine of the class described, the combination of a plurality of carriage feed mechanisms; means to couple said feed mechanisms together and to the carriage to render the feed mechanisms operable singly and in different combinations to effect a plurality of different feeds of the carriage, each different from the others and greater in number than the number of feed mechanisms; a controller for said feed mechanisms comprising a movable support, a series of selector elements mounted on the support for movement relative to each other and relative to the support, means to intercouple said elements for relative movement different degrees according to one factor of justification, means for moving said elements relative to each other, means to move said support and the elements supported thereby an extent commensurate with a different factor of justification, and means selectively controlled by said elements for operating the feed mechanisms singly and in various combinations according to the position of said elements with relation to each other.

14. In a machine of the class described, the combination of a plurality of carriage feed mechanisms; means to couple said feed mechanisms together and to the carriage to enable the feed mechanisms to be selectively operated singly and in different combinations to effect a plurality of different feeds of the carriage, each different from the others and greater in number than the number of feed mechanisms; a controller for said feed mechanisms comprising a movable support, a series of selector elements mounted on the support for movement relative to each other and relative to the support, means to intercouple said elements for relative movement different degrees according to one factor of justification, means for moving said elements relative to each other, means to move said support and the elements supported thereby an extent commensurate with a different factor of justification, means selectively controlled by said elements for operating the feed mechanisms singly and in various combinations according to the position of said elements with relation to each other, and means for moving said support an increment as an accompaniment to an operation of the feed mechanisms.

15. In a machine of the class described, the combination of a plurality of escapement mechanisms, each imparting to the carriage a different feeding movement, means to intercouple said escapement mechanisms for operation both singly and in various combinations; escapement operating means, means to couple the escapement mechanisms to the operating means; spacing control mechanism including a series of differentially movable elements, means controlled by said elements for selectively operating the coupling means, means differentially to position said elements according to factors of justification, and means for progressively re-positioning said elements when set, whereby to variably couple the escapement mechanisms to the operating means.

16. In a machine of the class described, the combination of a plurality of carriage feed mechanisms; means to couple said feed mechanisms together and to the carriage to render the feed mechanisms to be selectively operated singly and in different combinations to effect a plurality of different feeds of the carriage, each different from the others and greater in number than the number of feed mechanisms; a controller for said feed mechanisms comprising a movable support, a series of selector elements movably mounted on the support for movement relative to each other and relative to the support, means common to said elements for moving said elements relative to each other different degrees according to one factor of justification, means to move said support and the elements supported thereby from an initial position an extent commensurate with a different factor of justification, means selectively controlled by said elements for operating the feed mechanisms singly and in various combinations according to the position of said elements with relation to each other, means for moving said support an increment as an accompaniment to an operation of the feed mechanisms, means to return the carriage at the end of a line, and means rendered effective by an operation of the carriage return mechanism for restoring the movable support to its initial position.

17. In a machine of the class described, the combination of a carriage; a plurality of separate feed mechanisms for the carriage, means to intercouple said feed mechanisms for operation selectively either singly or in different combinations; a space bar, means controlled by the space bar for operating the selected feed mechanisms, a justification controller having means settable in accordance with two factors of justification and means controlled by the settings of the settable means for selecting the feed mechanisms for operation singly or in different combinations, a second key, and means controlled by the second key for causing an operation of a predetermined one of the feed mechanisms to effect an invariable feed of the carriage.

18. In a machine of the class described, the combination of a carriage, a series of selectively operable feed mechanisms for the carriage, operating means for the feed mechanisms, means to couple the feed mechanisms to the operating means for operation of the feed mechanisms singly or in different combinations, a space bar for causing operation of the operating means, operating means for the coupling means, and a justification controller having a plurality of control elements with means to variably selectively set said control elements according to a plurality of factors of justification, and means controlled by said elements for controlling the operating means for the coupling means selectively and combinationally.

19. In combination with a carriage, a series of feed mechanisms, each for producing a different feed of the carriage and intercoupled to enable said feed mechanisms to be operated either singly or in a plurality of different combinations of two or more together, a selector device for controlling said feed mechanisms comprising a series of relatively movable elements intercoupled for movement of the remainder different extents when a predetermined one of said elements is moved, means for differentially selectively moving the predetermined element, means controlled by said elements for selecting the feed mechanisms for operation according to the positions of said elements, and means to operate the selected feed mechanisms.

20. In a machine of the class described, the combination of a carriage, feed mechanism for the carriage; an automatic spacing controller for varying the effect of the spacing mechanism upon the carriage, including at least two movable elements, one movable relative to the other, a manual member for moving one element relative to the other an extent depending upon one factor of justification, and a manual member for moving both elements an extent depending upon another factor of justification; a space bar, means controlled by the space bar for moving both elements a predetermined extent for each operation of the space bar; and means controlled by said elements for controlling the operation of the feed mechanism to cause the latter to feed the carriage variable extents according to the settings of said members.

21. In combination with a carriage, a series of feed mechanisms, each for producing a different feed of the carriage and intercoupled to enable said feed mechanisms to be operated either singly or in a plurality of different combinations of two or more together, a selector device for controlling said feed mechanisms comprising a series of relatively movable elements intercoupled for movement of the remainder different extents when a predetermined one of said elements is moved, means for differentially selectively moving the predetermined element, means controlled by said elements for selectively controlling the operation of the feed mechanisms, means to operate the selected feed mechanisms, and a second means for moving all of said elements as a unit to change the effect of said elements upon the operating means for the feed mechanisms.

22. In combination with a carriage, variable feed mechanism for the carriage, means to operate the said mechanism to cause the carriage to move different extents, and means for variably selectively controlling the operation of the last named means comprising a series of control elements, means to intercouple said control elements for movement whereby movement of a predetermined one of said elements moves the others, means to move said predetermined element an extent commensurate with a factor of justification, means to move all of said elements as a unit an extent commensurate with a second and different factor of justification, and means interposed between said elements and the operating means for the feed mechanism whereby the positioning of said elements by the positioning means selectively controls the operating means.

23. In combination with the carriage of a typewriting machine, feed mechanism therefor, a spacing control unit including a plurality of settable elements each pre-settable in accordance with one of a plurality of different factors of justification, means controlled by said elements for variably controlling the feed mechanism, carriage return mechanism, and means operated by the carriage return mechanism for causing resetting of the spacing control unit.

24. In a machine of the class described, a carriage, variable operable feed mechanism therefor; a feed control device for controlling the feeding mechanism including a plurality of rotatable elements, means to rotate said elements relative to each other according to one factor of justification and for rotating all of said elements as a unit according to another factor of justification, said means being adapted to effect the movement of said elements by two successive operations, and means controlled by said elements when set for variably operating the feed mechanism; and means to reset the rotatable elements.

25. In a typewriting machine, a movable support, a plurality of selector elements movably mounted in said support, means settable in accordance with one factor of justification for moving one of said selector elements relative to the other, means settable in accordance with another factor of justification for moving the support and the relatively movable elements as a unit, carriage feed mechanism, and means controlled by the position of the selector elements for controlling the extent of feed effected by the feed mechanism.

26. In a typewriting machine a movable support, a plurality of selector elements movably mounted in said support, means settable in accordance with one factor of justification for moving one of said selector elements relative to the other, means settable in accordance with another factor of justification for moving the support and the relatively movable elements as a unit, carriage feed mechanism, means controlled by the position of the selector elements for controlling the extent of feed effected by the feed mechanism, carriage return mechanism, and means controlled by the carriage return mechanism for restoring the movable support to its normal position.

27. In a typewriting machine, the combination of a movable support, a plurality of control means mounted on the support and movable relative to each other and to the support, a plurality of manual setting members, each settable in accordance with one of a plurality of factors of justification, one of said setting members moving said support in accordance with one factor of justification and the other of said members moving the control means relative to each other and relative to the support extents corresponding to another factor of justification, an escapement device operative to cause the support to move back toward its initial position, carriage feed mechanism, means controlled by the control elements for selectively controlling the operation of the feed mechanism to vary the effect thereof, a space bar, and means controlled by the space bar for operating the feed mechanism and the escapement device for said support.

28. In a typewriting machine, the combination of a movable support, a plurality of control means mounted on the support and movable relative to each other and to the support, a plurality of manual setting members, each settable in accordance with one of a plurality of factors of justification, one of said setting members moving said support in accordance with one factor of justification and the other of said members moving the control means relative to each other and relative to the support extents corresponding to another factor of justification, an escapement device operative to cause the support to move back toward its initial position, carriage feed mechanism, means controlled by the control means for selectively controlling the operation of the feed mechanism to vary the effect thereof, a space bar, means controlled by the space bar for operating the feed mechanism and the escapement device for said support, power carriage return mechanism, means to initiate operation of the carriage return mechanism, and means operated by the carriage return mechanism for causing the restoration of the support to its initial position.

29. In combination with the carriage of a typewriting machine, variable feed mechanism including a series of selectively actuable elements each element when actuated causing the carriage to be fed a different extent; a selector device for selectively and combinationally controlling the actuation of the actuable elements, said selector device comprising a plurality of selector elements with means to intercouple the selector elements for movement together, a single means for moving all of the selector elements through the coupling means according to a single factor of justification, a second means for moving all of the selector elements as a unit in accordance with a different factor of justification, means controlled by the positions of said selector elements for selectively actuating the actuable elements; and means to automatically reset one of said moving means.

30. In combination with a carriage, variable feed mechanism including a series of selectively actuable elements, each when operated causing the carriage to be moved an extent differently from the feeds caused by operation of the other elements, said elements being operable either singly or in different combinations to cause the carriage to be moved extents greater in number than the number of actuable elements; and a controller for automatically controlling the operation of said elements, comprising a series of movable selector elements, means common to all of said selector elements for positioning them different extents to represent a factor of justification, and operating means for the actuable elements selectively controlled by the position of said selector elements, said selector elements causing the operating means to actuate the actuable elements singly and in one or more combinations according to the positions of the selector elements.

31. In combination with a carriage; variable feed mechanism including a series of selectively operable elements, each when operated causing the carriage to be moved an extent different from the feeds caused by operation of the other elements, said elements being operable either singly or in different combinations to cause the carriage to be moved extents greater in number than the number of operable elements; operating means for said elements and a controller for automatically controlling the operation of said elements, comprising a series of movable selector elements, said selector elements causing the operable elements to be operated by the operating means singly and in one or more combinations according to the positions of the selector elements, means to cause an operation of the operating means between groups of characters, and means to progressively move all of the selector elements as a unit upon an operation of the operable elements whereby to progressively change the effect of the selector elements on the operating means.

32. In combination with a carriage; variable escapement mechanism for the carriage including a series of selectively operable elements, each actuating the escapement mechanism to allow the carriage to move an extent different from the movements effected by the other elements; means to operate said elements, a controller for the variable escapement mechanism comprising a series of selector elements rotatable on a common axis and means common to said rotatable elements for rotating them different extents relative to each other to represent one of two factors of justification; and means controlled by the positions of said elements for selectively and combinationally controlling the operation of the operable elements by the operating means.

33. In combination with a carriage; variable escapement mechanism for the carriage including a series of selectively operable elements, each actuating the escapement mechanism to allow the carriage to move an extent different from the movements effected by the other elements; means to operate said elements, a controller for the variable escapement mechanism comprising a series of selector elements rotatable on a common axis, means common to said rotatable elements for rotating them different extents relative to each other to represent one of two factors of justification, means common to said rotatable elements for rotating said elements an additional extent to represent another factor of justification; and means controlled by the positions of said elements for selectively and combinationally controlling the operation of the operable elements by the operating means.

34. In combination with a carriage, variable escapement mechanism for the carriage including a series of selectively operable elements, each operating the escapement mechanism to allow the carriage to move an extent different from the movements effected by the other elements, means to operate said elements, a controller for the variable escapement mechanism comprising a series of selector elements rotatable on a common axis, means for rotating said elements different extents relative to each other to represent one of two factors of justification, automatic means to rotate said rotatable elements upon an operation of the operable elements; and means controlled by the positions of said elements for selectively and combinationally controlling the operation of the operable elements by the operating means.

35. In combination with a carriage, variable feed mechanism for the carriage, selectively operable means to operate the feed mechanism; an automatic controller for said feed mechanism comprising a plurality of selector elements, a movable support for said selector elements, a common operating member for moving said elements relative to each other to represent one factor of justification and for moving said support to represent another factor of justification, and means interconnecting said member, said elements, and said support to enable said common operating member to effect both movements by two separate operations of said member; and means to control the feed mechanism variably according to the relative settings of said elements and the position of said support.

36. In combination with a carriage, variable feed mechanism for the carriage including a plurality of selectively operable elements each when operated causing a different feed of the carriage from the others, operating means for said elements and selectively controllable to cause said elements to be actuated singly or in one or more different combinations; and a controller for said operating means including a series of control elements, means to enable the control elements to selectively and combinationally control the operating means according to the positions of the control elements, and a plurality of setting means each common to all of said control elements and operable to position said elements two different extents according to two different factors of justification.

37. In combination with a carriage, variable feed mechanism for the carriage including a plurality of selectively operable elements each when operated causing a different feed of the carriage from the others, operating means for said elements and selectively controllable to cause said elements to be actuated singly or in one or more different combinations; and a controller for said operating means including a series of control elements, means to enable the control elements to selectively and combinationally control the operating means according to the positions of the control elements, a plurality of setting means each common to all of said control elements and operable to position said elements two different extents according to two different factors of justification, means to cause an operation of the operating means between groups of characters, and means controlled thereby for moving said control elements whereby to change their effect upon the operating means with each operation thereof.

RONALD D. DODGE.